United States Patent [19]
Miyamoto et al.

[11] Patent Number: 5,987,267
[45] Date of Patent: Nov. 16, 1999

[54] MAGNETIC RECORDING/REPRODUCING APPARATUS OF CAMERA

[75] Inventors: Hidenori Miyamoto, Urayasu; Tadashi Otani, Otawara, both of Japan

[73] Assignee: Nikon Corporation, Tokyo, Japan

[21] Appl. No.: 09/008,478

[22] Filed: Jan. 16, 1998

[30] Foreign Application Priority Data

| Jan. 20, 1997 | [JP] | Japan | 9-007588 |
| Jan. 20, 1997 | [JP] | Japan | 9-007590 |
| Jan. 20, 1997 | [JP] | Japan | 9-007591 |
| Apr. 21, 1997 | [JP] | Japan | 9-103007 |

[51] Int. Cl.$^6$ ............... G03B 17/24; G11B 15/12; G11B 5/00; G11B 5/17
[52] U.S. Cl. ............... 396/319; 360/1; 360/62; 360/123
[58] Field of Search ............... 396/319; 360/62, 360/1, 123, 55

[56] References Cited

U.S. PATENT DOCUMENTS

| 5,122,899 | 6/1992 | Kaji | 360/62 X |
| 5,652,931 | 7/1997 | Kazami | 396/319 |

*Primary Examiner*—W. B. Perkey
*Attorney, Agent, or Firm*—Oliff & Berridge, PLC

[57] ABSTRACT

A magnetic recording/reproducing apparatus of a camera, includes; a magnetic head having a single coil; a recording circuit that causes the magnetic head to record magnetic information on a film; a reproducing circuit that causes the magnetic head to reproduce magnetic information recorded on the film; and a disconnecting circuit that disconnects the recording circuit from the magnetic head during magnetic reproduction by the reproducing circuit.

9 Claims, 20 Drawing Sheets

R1, C1, D1 ARE COMPONENTS PRESENT IN AN OPE-AMP CIRCUIT

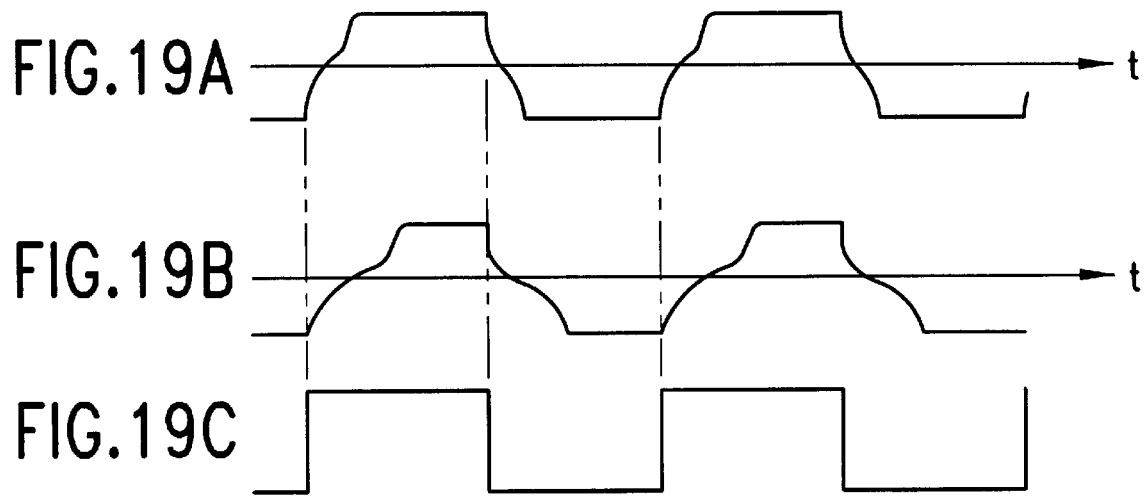

MAGNETIC RECORDING/REPRODUCING APPARATUS OF CAMERA

INCORPORATION BY REFERENCE

The disclosures of the following priority applications are herein incorporated by reference:

Japanese Patent Application No. 9-7588 filed Jan. 20, 1997

Japanese Patent Application No. 9-7590 filed Jan. 20, 1997

Japanese Patent Application No. 9-7591 filed Jan. 20, 1997

Japanese Patent Application No. 9-103007 filed Apr. 21, 1997

BACKGROUND OF THE INVENTION

1. Field of the Invention

The present invention relates to magnetic recording/reproducing apparatus used in cameras, which are adapted to record magnetic information on films, and reproduce magnetic information recorded on films. Magnetic information means information to be recorded magnetically or information which has been magnetically recorded.

2. Description of Related Art

Magnetic recording/reproducing apparatus of cameras are known which record magnetic information on films, and reproduce or read out magnetic information recorded on the films.

FIG. 18 shows the construction of a magnetic head used in a known example of magnetic recording/reproducing apparatus of a camera. In the known magnetic head, a recording coil 31 and a reproducing coil 32 are wound on a common core 33, and the coil 31 is exclusively used for magnetic recording while the coil 32 is exclusively used for magnetic reproduction. FIG. 18 also shows a bobbin 34, head cover 35, and a film 36.

FIG. 19A–FIG. 19C show various waveforms of current flowing through a coil containing 300 turns or loops during magnetic recording. More specifically, FIG. 19A shows a current waveform in the case where the film is transported or moved at a speed of 50 mm/sec., and FIG. 19B shows a current waveform in the case where the film is transported at a speed of 100 mm/sec. FIG. 19C shows an ideal current waveform.

The ideal waveform of the current flowing through the coil during magnetic recording has steep rises and falls as shown in FIG. 19C, but in practice the current rises and falls with a delay due to the inductance of the coil in actual. The inductance of the coil is proportional to the number of turns of the coil. Namely, the inductance is reduced with a decrease in the number of turns, and the recording current rises and falls more steeply or sharply as the number of turns of the coil is reduced.

Although rising and falling characteristics of the recording current do not change where the film transport speed at which the film is moved relative to the magnetic head is changed, rising and falling of the recording current, when observed on the basis of the film transport amount (or distance by which the film is moved), are delayed as the film transport speed is increased, as shown in FIG. 9B. As a result, the rising and falling of the recording current may not follow the film transport speed properly, and magnetic recording may not be normally performed.

In the meantime, a given magnetomotive force [AT] (ampere-turn) is needed for magnetically recording information on a magnetic recording medium of a film. If the number of turns of the recording coil is reduced so as to produce steep rises and falls of the recording current, the recording current must be increased so as to maintain the given magnetomotive force, which results in increased current capacity of a recording circuit, and increased power consumption.

Accordingly, the number of turns of the recording coil needs to be determined in view of all aspects of the film transport speed, current capacity of the recording circuit, power consumption, and the like.

FIGS. 20A and 20B show waveforms of current that flows through a coil during magnetic reproduction, wherein FIG. 20A shows a waveform of current that flows through a coil containing 1000 turns, and FIG. 20B shows a waveform of current that flows through a coil containing 100 turns.

Since the magnetic recording medium of the film has a very small intensity of magnetization, the S/N ratio is increased with an increase in the number of turns of the coil. When 1000-turn coil is used, for example, signal components and noise components can be clearly distinguished from each other even if noises are superposed on reproduced signals, as shown in FIG. 20A. When 100-turn coil is used, on the other hand, reproduced signals are obscured by noises, thus making it difficult to separate signal components from noise components.

As described above, the coil used for magnetic recording is desired to have a relatively small number of turns, so that the waveform of recording current, when plotted against the film transport amount or distance, shows steep rises and falls even at a high film transport speed, assuring increased reliability in magnetic recording operations. On the other hand, the coil used for magnetic reproduction is desired to have a relatively large number of turns, so that the S/N ratio is increased, assuring increased reliability in magnetic reproducing operations.

In the known magnetic head, therefore, the recording coil 31 containing a relatively small number of turns and the reproducing coil 32 containing a relatively large number of turns are wound on the common core 33, as shown in FIG. 18, such that the coal 31 is exclusively used for recording, and the coil 32 is exclusively used for reproduction.

In the known magnetic recording/reproducing apparatus of the camera, however, the recording coil and reproducing coil are separately provided as illustrated above, and therefore the size of the magnetic head is undesirably increased.

SUMMARY OF THE INVENTION

It is therefore an object of the present invention to provide a magnetic recording/reproducing apparatus of a camera having a reduced size of magnetic head, and, in particular to provide such a magnetic recording/reproducing apparatus of a camera that achieves reduction in the size of the magnetic head while maintaining high reliability in magnetic recording and reproducing operations.

To accomplish the above object, there is provided according to the present invention a magnetic recording/reproducing apparatus of a camera, comprising; a magnetic head having a single coil; a recording circuit that causes the magnetic head to record magnetic information on a film; a reproducing circuit that causes the magnetic head to reproduce magnetic information recorded on the film; and a disconnecting circuit that disconnects the recording circuit from the magnetic head during magnetic reproduction by the reproducing circuit.

There is also provided a magnetic recording/reproducing apparatus of a camera, comprising; a magnetic head having a single coil; a recording circuit that causes the magnetic head to record magnetic information on a film; a reproducing circuit that causes the magnetic head to reproduce magnetic information recorded on the film; and a disconnecting circuit that disconnects the reproducing circuit from the magnetic head during magnetic recording by the recording circuit.

There is also provided a magnetic recording/reproducing apparatus of a camera, comprising; a magnetic head having a single coil; a recording circuit that causes the magnetic head to record magnetic information on a film; a reproducing circuit that causes the magnetic head to reproduce magnetic information recorded on the film; a recording disconnecting circuit that disconnects the recording circuit from the magnetic head during magnetic reproducing; and a reproduction disconnecting circuit that disconnects the reproducing circuit from the magnetic head during magnetic recording.

There is also provided a magnetic recording/reproducing apparatus of a camera, comprising; a magnetic head having a single coil; a recording circuit that causes the magnetic head to record magnetic information on a film; a reproducing circuit that causes the magnetic head to reproduce magnetic information recorded on the film; a reference potential circuit connected to the reproducing circuit so as to establish a reference potential of the reproducing circuit; and a high impedance element that is connected between the recording circuit and the reference potential circuit.

There is also provided a magnetic recording/reproducing apparatus of a camera, comprising; a magnetic head having a single coil; a recording circuit that causes the magnetic head to record magnetic information on a film; and a reproducing circuit that causes the magnetic head to reproduce magnetic information recorded on the film. And a number of turns of the coil of the magnetic head is determined in view of a film transport speed during magnetic writing.

There is also provided a magnetic recording/reproducing apparatus of a camera, comprising; a magnetic head having a single coil; a recording circuit that causes the magnetic head to record magnetic information on a film; and a reproducing circuit that causes the magnetic head to reproduce magnetic information recorded on the film. And a number of turns of the coil of the magnetic head is set to be within a range of 250 to 350 turns when an axial spacing between the magnetic head and a motor for transporting the film is 20 mm or more.

There is also provided a magnetic recording/reproducing apparatus of a camera, comprising; a magnetic head having a single coil; a recording circuit that causes the magnetic head to record magnetic information on a film; and a reproducing circuit that causes the magnetic head to reproduce magnetic information recorded on the film. And a number of turns of the coil of the magnetic head is set to be within a range of 250 to 350 turns when a magnetic shield is provided around an outer periphery of a motor for transporting the film.

BRIEF DESCRIPTION OF THE DRAWINGS

FIGS. 19A–19C are views showing a waveform of current flowing through a coil of a magnetic head during magnetic recording.

DESCRIPTION OF THE PREFERRED EMBODIMENTS

First embodiment

Figure 1:
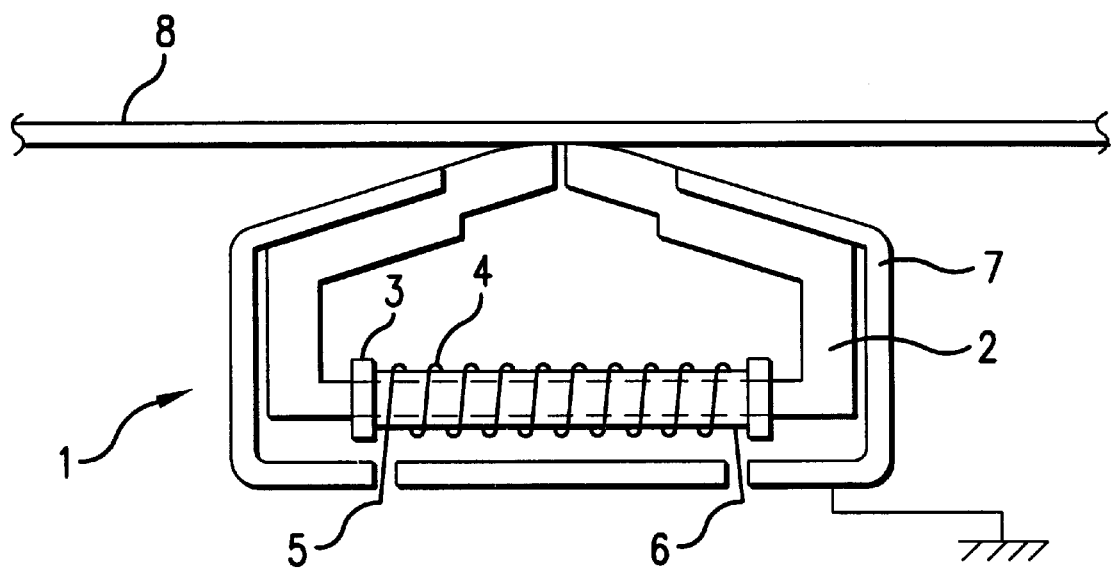
FIG. 1 is a view showing the construction of a magnetic head of the first embodiment of the present invention.

FIG. 1 shows the construction of a magnetic head of a magnetic recording/reproducing apparatus of a camera according to the first embodiment of the present invention.

The magnetic head 1 has a core 2, bobbin 3 through which the core 2 extends, and a coil 4 that is wound on the bobbin 3. A terminal 5 is drawn out from one end of the coil 4 at which the winding of the coil is started, and a terminal 6 is drawn out from the other end of the coil 4 at which the winding is finished. The coil 4 and core 2 are covered with a head cover 7 that is connected to a common line of the camera. FIG. 1 also shows a film 8.

As described above, the magnetic head 1 operates with an improved reliability in magnetic recording operations as the number of turns of the coil is reduced, and operates with an improved reliability in magnetic reproducing operations as the number of turns of the coil is increased. As a result of various experiments in which the number of turns, film transport speed, coil current and other conditions are varied, the present inventor(s) found that when the film transport speed is controlled to 50 mm/sec or lower, and the coil contains 300 turns or loops, the waveform of recording current, when plotted against the film transport amount, is sure to provide steep rises and falls during magnetic recording, and the S/N ratio of reproduced signals to noises during magnetic reproduction becomes a sufficiently high level.

In the present embodiment, therefore, the number of turns of the coil 4 is made equal to 300 turns, and the obtained coil 4 is used in common for magnetic recording and reproduction.

Figure 18:
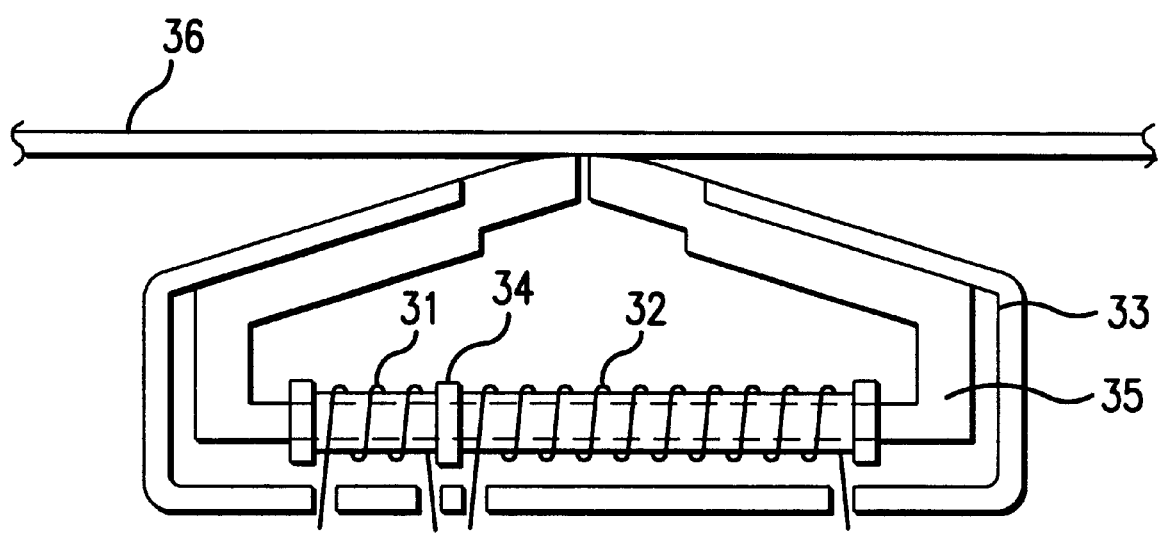
FIG. 18 is a view showing the construction of a magnetic head of a known magnetic recording/reproducing apparatus of a camera.
Figure 20A:
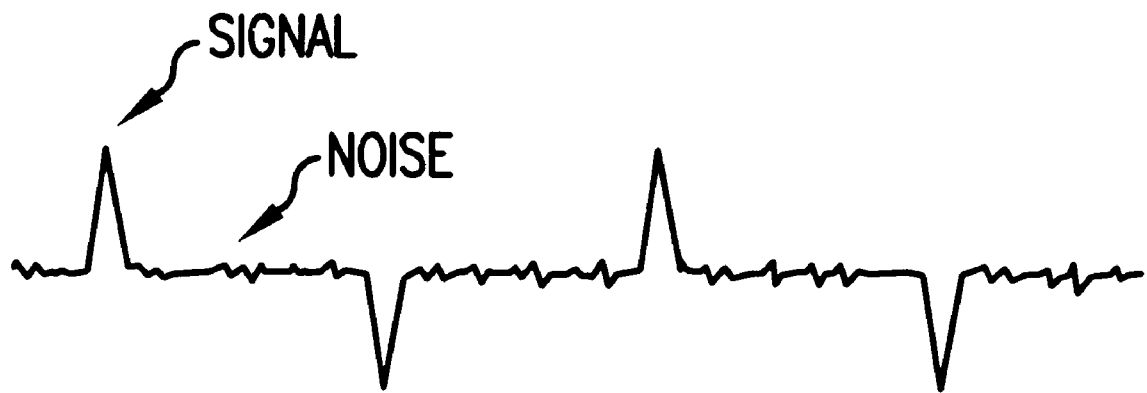
FIGS. 20A–20B are views showing a waveform of current flowing through a coil of a magnetic head during magnetic reproduction.
Figure 20B:
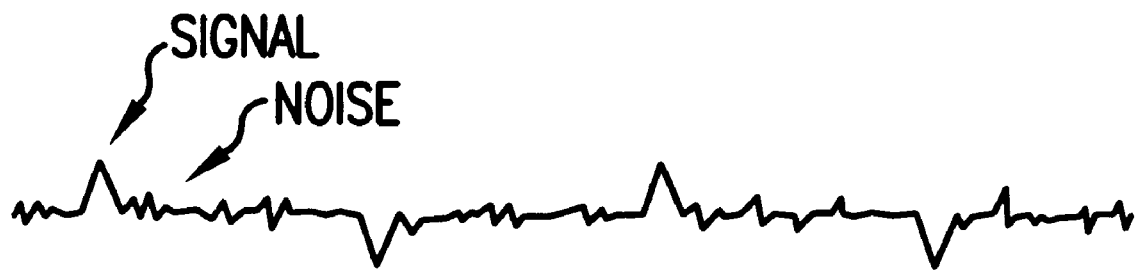

If each of the recording coil 31 and reproducing coil 32 of the known magnetic head shown in FIG. 18 contains 300 turns, to provide the same number of turns of coil during magnetic recording and magnetic reproduction as used in the present embodiment, these recording and reproducing coils 31, 32 of the known magnetic head provide an equivalent coil containing a total of 600 turns. Thus, the number of turns can be reduced by 300 turns in the present embodiment as compared with the known magnetic head, and the size of the magnetic head can be accordingly reduced. Further, the magnetic head of the present embodiment has a simple structure produced by merely winding a single wire on the core to form the coil, thereby assuring improved reliability and reduced cost.

Figure 2:
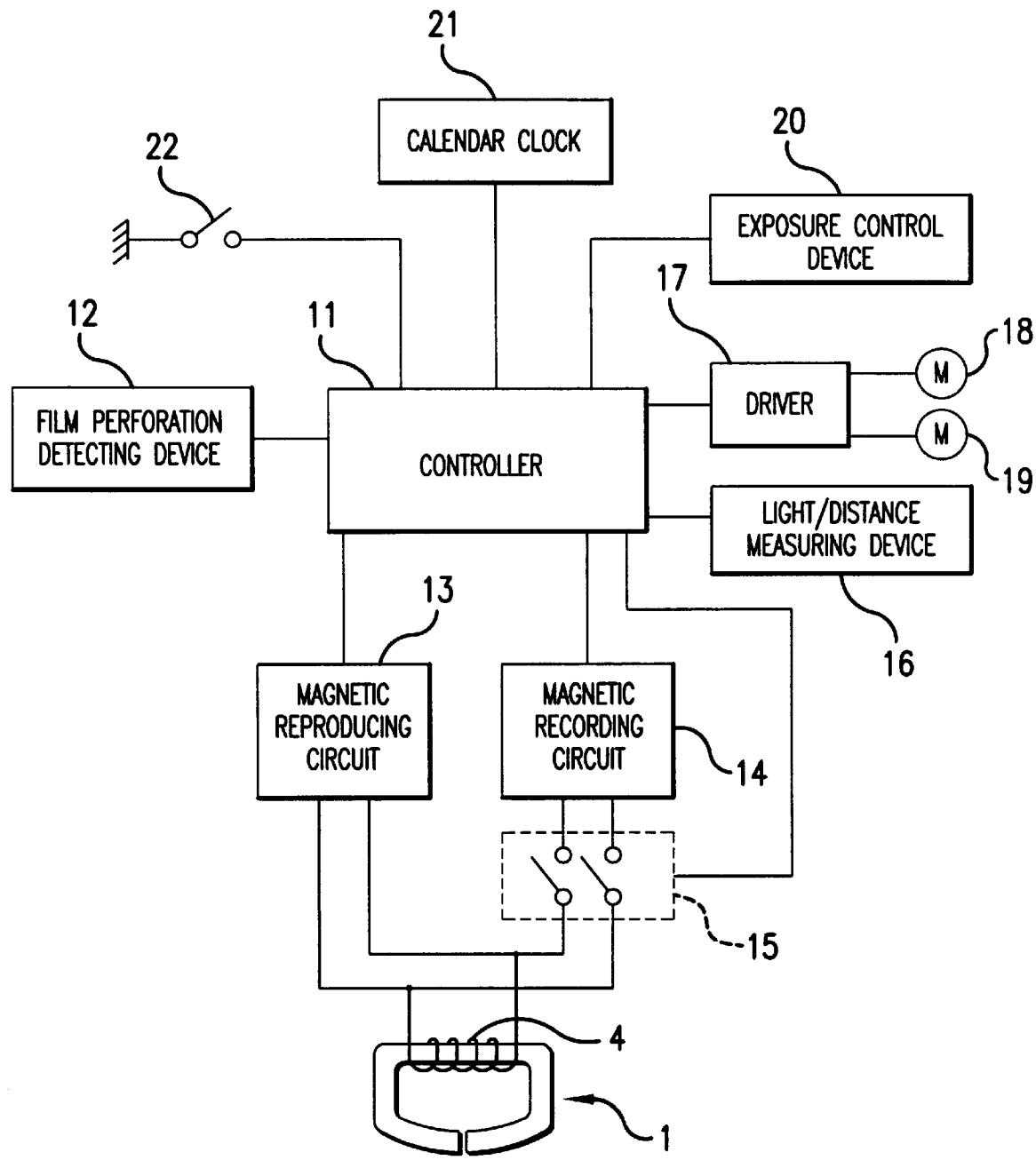
FIG. 2 in a view showing the construction of the first embodiment.

FIG. 2 shows the construction of the magnetic recording/reproducing apparatus of the present embodiment. A controller 11 consists of a microcomputer and its peripheral equipments, and serves to perform various operations and sequence control of the camera. To this controller 11 are connected a perforation detecting device 12 for detecting perforations of films, magnetic reproducing circuit 13, magnetic recording circuit 14, recording circuit open switch 15, light/distance measuring device 16, driver 17 and motors 18, 19, exposure control device 20, calendar clock 21, shutter release switch 22 and others.

The perforation detecting device 12 serves to detect perforations formed through a film. The controller 11 controls film transport operations based on the result of detection on the perforations, and also controls magnetic recording/reproducing operations. The magnetic reproducing circuit 13 reads magnetic reproduction signals from the magnetic head 1, and reproduces magnetic information recorded on the film. The magnetic recording circuit 14 supplies magnetic recording signals to the magnetic head 1, and records magnetic information on the film. The recording circuit open switch 15 is opened and closed according to a command signal from the controller 11, so as to disconnect the magnetic recording circuit 14 from the magnetic head 11 during magnetic reproduction, thereby to remove noises that would be otherwise introduced through the magnetic recording circuit 14.

The light/distance measuring device 16 serves to measure the luminance of a subject to be photographed, and a photographing distance from the camera to the subject. This distance may be measured by a distance measuring device that detects the focusing condition of a photographing lens. The driver 17 drives a motor 18 for transporting the film and a motor 19 for driving the lens, according to control signals from the controller 11. The exposure control device 20 serves to drive a diaphragm mechanism and a shutter mechanism in a controlled manner according to exposure control signals from the controller 11, so as to expose the film to an image light. The calendar clock 21 counts the date and time, namely, year, month, day, and hour and minute, for example. The release switch 22 closes a circuit path when a release button (not shown) is depressed.

Figure 3:
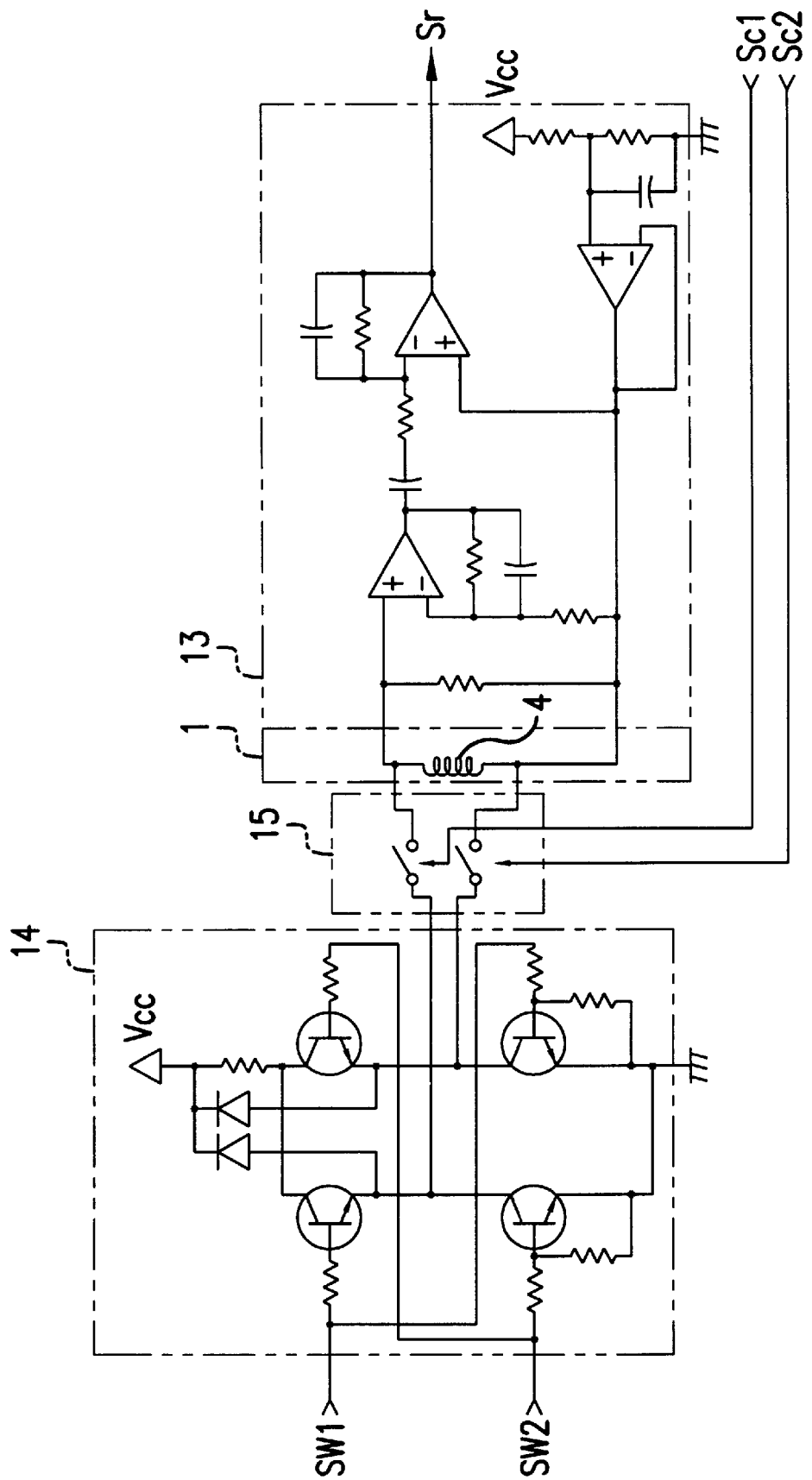
FIG. 3 is a circuit diagram showing in detail a magnetic recording circuit and a magnetic reproducing circuit of the first embodiment.

FIG. 3 is a circuit diagram showing in detail the magnetic reproducing circuit 13 and magnetic recording circuit 14.

The magnetic reproducing circuit 13 amplifies a magnetic reproduction signal received from the coil 4 of the magnetic head 1, and outputs the resulting reproduced signal Sr to the controller 11. The magnetic recording circuit 14 causes recording current to flow into the coil 4 of the magnetic head 1 in opposite directions, in response to recording signals Sw1, Sw2 alternately received from the controller 11, and records magnetic information in the form of bits on the film. Since the magnetic reproducing circuit 13 and magnetic recording circuit 14 are well-known in the art, and are not directly related to the present invention, detailed description of these circuits will not be provided.

The opening and closing of the recording circuit open switch 15 is controlled by control signals Sc1, Sc2 from the controller 11, and this switch 15 is opened during magnetic reproduction so as to disconnect the magnetic recording circuit 14 from the magnetic head 1. If the magnetic recording circuit 14 and the magnetic head 1 are kept connected to each other during magnetic reproduction, the magnetic recording circuit 14 may operate as an antenna and receive electromagnetic noises or the like, and the noises may be included in the magnetic reproduction signal, with a result of reduction in the S/N ratio. In the present embodiment, the magnetic recording circuit 14 and magnetic head 1 are disconnected from each other during magnetic reproduction, and noises are prevented from being introduced from the magnetic recording circuit 14 operating as an antenna into the magnetic head 1, which leads to improved reliability in magnetic reproducing operations.

The magnetic reproducing circuit 13, which has a high impedance with respect to the input from the magnetic head 1, does not operate as an antenna to cause noises to be included in magnetic recording signals even if the magnetic reproducing circuit 13 is kept connected to the magnetic head 1 during magnetic recording operations.

Figure 4:
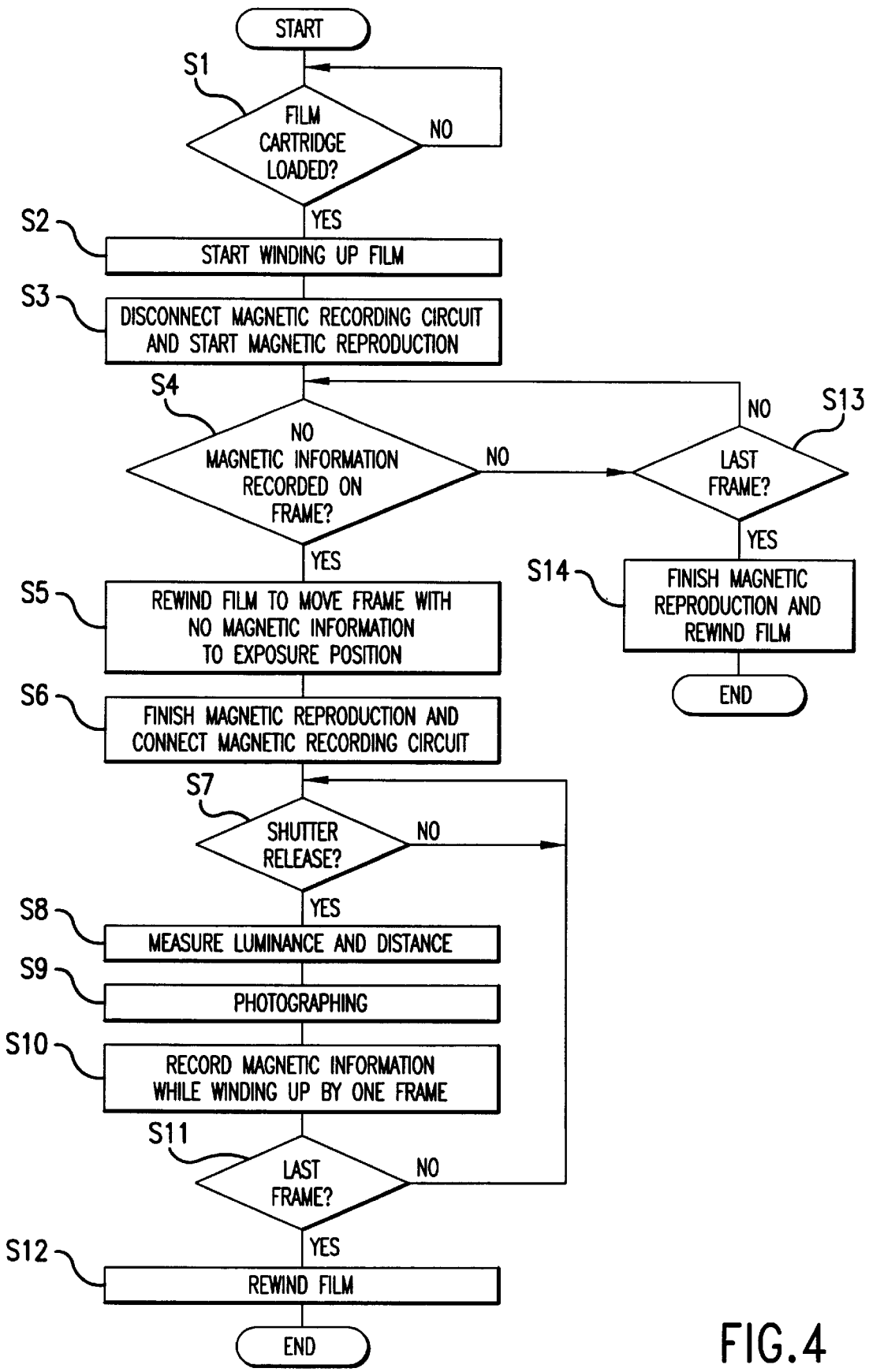
FIG. 4 is a flowchart showing the operation of the first embodiment.

FIG. 4 is a flowchart showing a control program executed by the controller 11. The operation of the present embodiment will be described referring to this flow chart.

Step S1 is initially executed to detect an ON/OFF state of a cartridge loading detection switch that is not illustrated, so as to determine whether a film cartridge is loaded in a cartridge chamber. If step S1 determines that the film cartridge is loaded in the cartridge chamber, step S2 is executed to control the driver 17 to drive the motor 18 so as to start winding up the film. In the next step S3, the switch 15 is opened to disconnect the magnetic recording circuit 14 from the magnetic head 1, and the magnetic reproducing circuit 13 is controlled to cause the magnetic head 1 to start reproducing or reading magnetic information on the film.

In step 54, it is determined whether no magnetic information is recorded on a frame of the film that has been wound up to be brought into a position corresponding to the magnetic head 1.

In the present embodiment, the magnetic head 1 is used for both magnetic recording and magnetic reproduction. To magnetically record information about photographing on a frame with which a picture has been taken, the magnetic head 1 is installed on the side of a takeup spool (not shown) of the camera with respect to the photographing or exposure position (behind the aperture of the camera). When reproducing magnetic information recorded on a certain frame, therefore, this frame needs to be wound up by a distance corresponding to about one frame beyond the exposure position, and the magnetic information in the film is reproducing during the wind-up operation.

If magnetic information is recorded on the frame in question in the current control cycle, this frame is determined to have been exposed, and the control flow goes to step S13. In step 13, it is determined whether magnetic information is present on this frame and following frames until the last frame is reached, and if magnetic information is recorded on all of the frames including the last frame, step S13 determines that photographing with all of the frames has been completed. The control flow then goes to step S14 to cause the magnetic reproducing circuit 13 to finish reproduction of magnetic information, and control the driver 17 to drive the motor 18 so as to rewind the film into the cartridge. While the last frame has not been wound up, on the other hand, the control flow returns to step S4 to determine whether no magnetic information is recorded on the next frame.

When no magnetic information is recorded on the frame in question, it is determined in step S4 the frame has not been exposed to an image light, namely, has not been used for photographing, and the control flow goes to step S5. In step S5, the driver 17 is controlled to drive the motor 18 so as to rewind the film until the unexposed frame on which no magnetic information is recorded is brought back to the exposure position. In the next step S6, the operation of the magnetic reproducing circuit 13 for reproducing magnetic information is finished, and the switch 15 is closed so that the magnetic recording circuit 14 and the magnetic head 1 are connected to each other.

If depression of the shutter release button is detected by means of the release switch 22 in step S7, the control flow goes to step S8 to operate the light/distance measuring device 16 to measure the luminance of the subject and the photographing distance, i.e., distance between the camera and the subject. Step S9 is then executed to control the driver 17 to drive the motor 19 so that the photographing lens is focused based on the photographing distance thus measured. Further, the exposure control apparatus 20 is controlled to drive the diaphragm mechanism and shutter, so that a picture is taken in accordance with the luminance of the subject measured by the light/distance measuring device 16.

In step S10 following the photographing action, the controller 11 controls the magnetic recording circuit 14 to record magnetic information about photographing on the film by means of the magnetic head 1, while winding up the film by one frame by means of the driver 17 and motor 18. Step S11 is then executed to determine whether photographing has been finished with all frames including the last flame. If photographing has been finished with all frames of the film, step S12 is then executed to rewind the film into the cartridge by means of the driver 17 and motor 18. If a negative decision is obtained in step S11, namely, photographing has not been finished with all frames, the control flow returns to step S7, and the next frame is used for photographing.

Second embodiment

Figure 5:
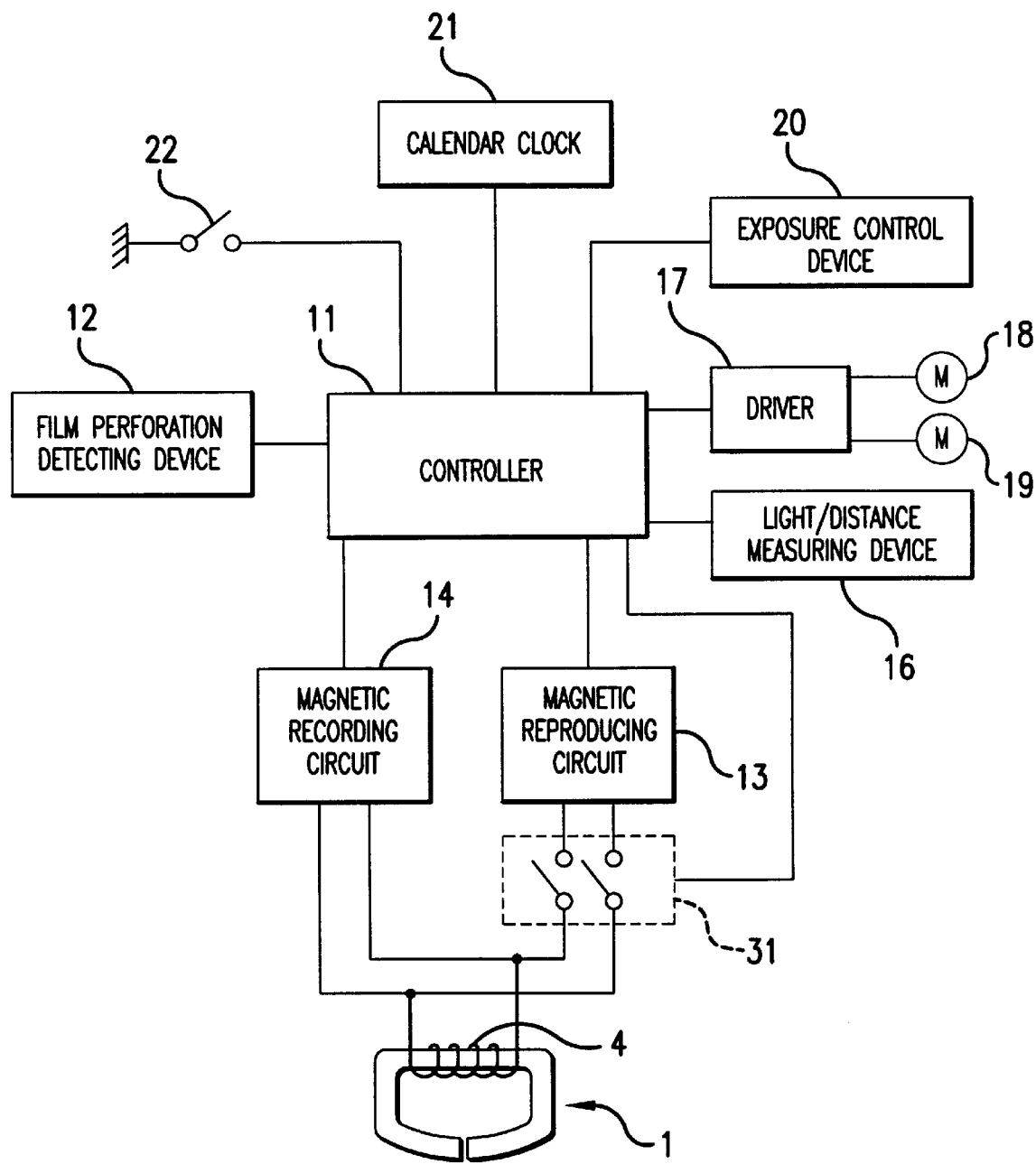
FIG. 5 is a view showing the construction of the second embodiment of the present invention.

FIG. 5 shows the construction of a magnetic recording/reproducing apparatus of the second embodiment of the invention. In FIG. 5, the same reference numerals as used in FIG. 2 are used for identifying the corresponding elements, of which no description will be provided. The second embodiment is different from the first embodiment of FIG. 2 in that a reproducing circuit open switch 31 is provided on the side of the magnetic reproducing circuit 13, instead of the magnetic recording circuit open switch 15 provided on the side of the magnetic recording circuit 14. The magnetic head 1 is similar to that of the first embodiment shown in FIG. 1.

Figure 6:
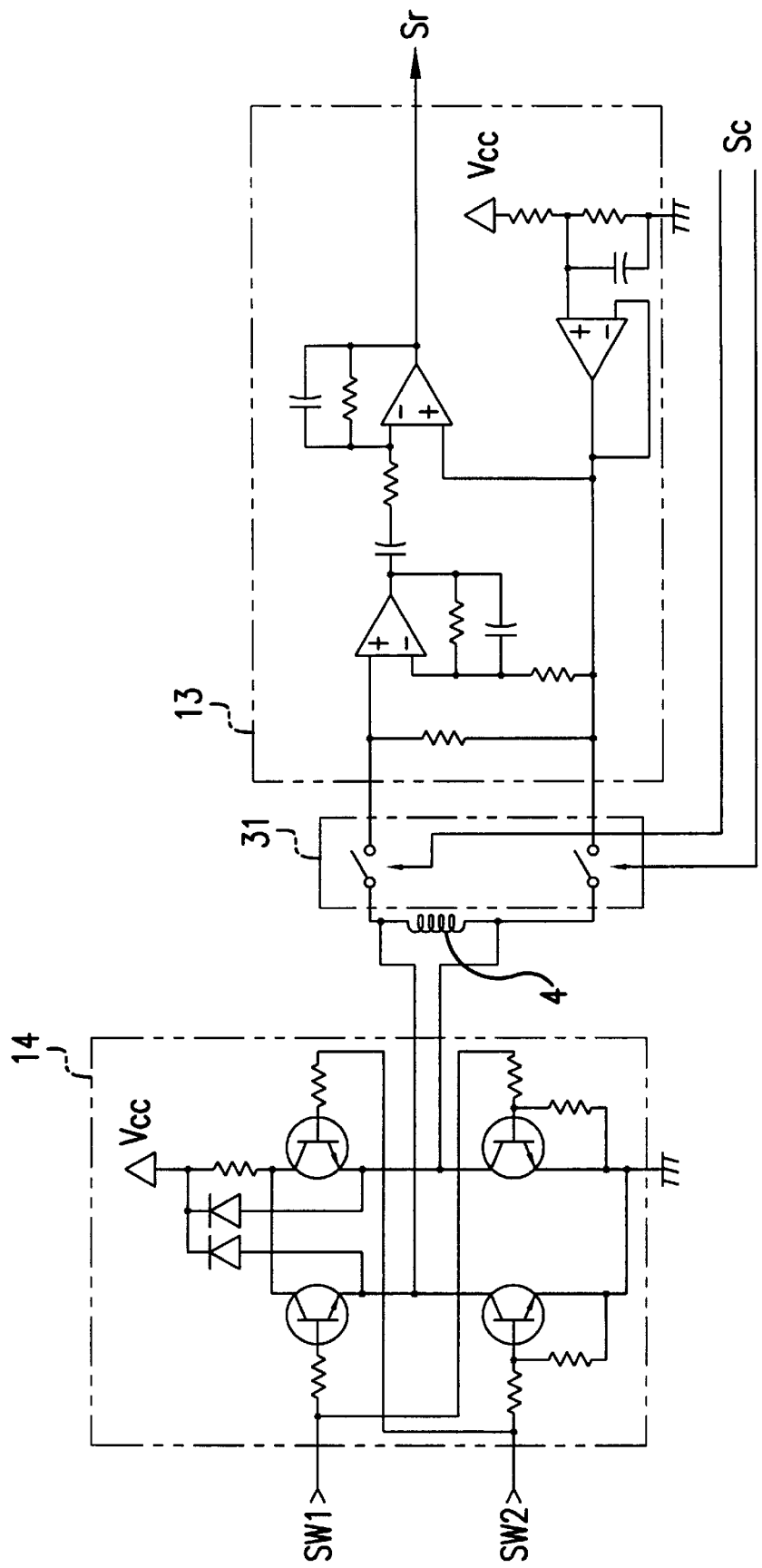
FIG. 6 is a circuit diagram showing in detail a magnetic reproducing circuit and a magnetic recording circuit of the second embodiment.

FIG. 6 is a circuit diagram showing details of the reproducing circuit open switch 31, magnetic reproducing circuit 13 and magnetic recording circuit 14. The magnetic reproducing circuit 13 amplifies a magnetic reproduction signal received from the coil 4 of the magnetic head 1, and outputs the resulting reproduced signal Sr to the controller 11. The magnetic recording circuit 14 causes recording current to flow into the coil 4 of the magnetic head 1 in opposite directions, according to recording signals Sw1, Sw2 alternately received from the controller 11, and records magnetic digital information on the film. The opening and closing of the reproducing circuit open switch 31 is controlled by a control signals Sc from the controller 11, such that the switch 15 is opened during magnetic recording so as to disconnect the magnetic reproducing circuit 13 from the magnetic head 1.

Figure 7:
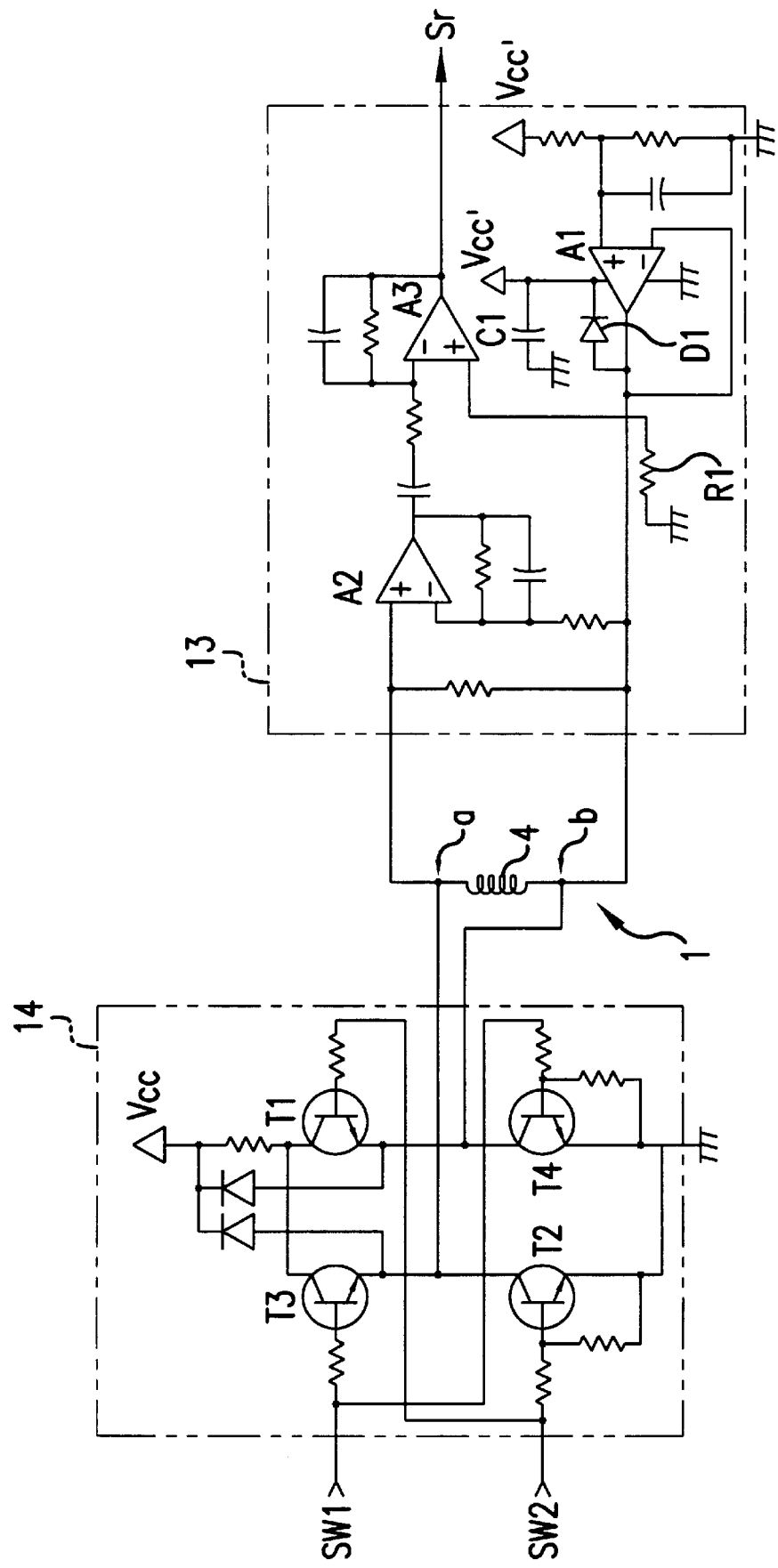
FIG. 7 is a view for explaining a problem encountered when a magnetic reproducing circuit is kept connected to a magnetic head.

In the first embodiment, the magnetic recording circuit 14 and the magnetic head 1 are disconnected from each other during magnetic reproduction, so that noises are prevented from being introduced from the magnetic recording circuit 14 operating as an antenna, thereby to improve the reliability of the apparatus during magnetic reproduction. If the level of the noises from the magnetic recording circuit 14 having an antenna effect is small enough to be neglected, a modified example as shown in FIG. 7 may be proposed in which the magnetic reproducing circuit 13 and magnetic recording circuit 14 are kept connected to each other all the time. This example, however, suffers from a problem as follows, and the second embodiment is intended to solve this problem.

Figure 8:
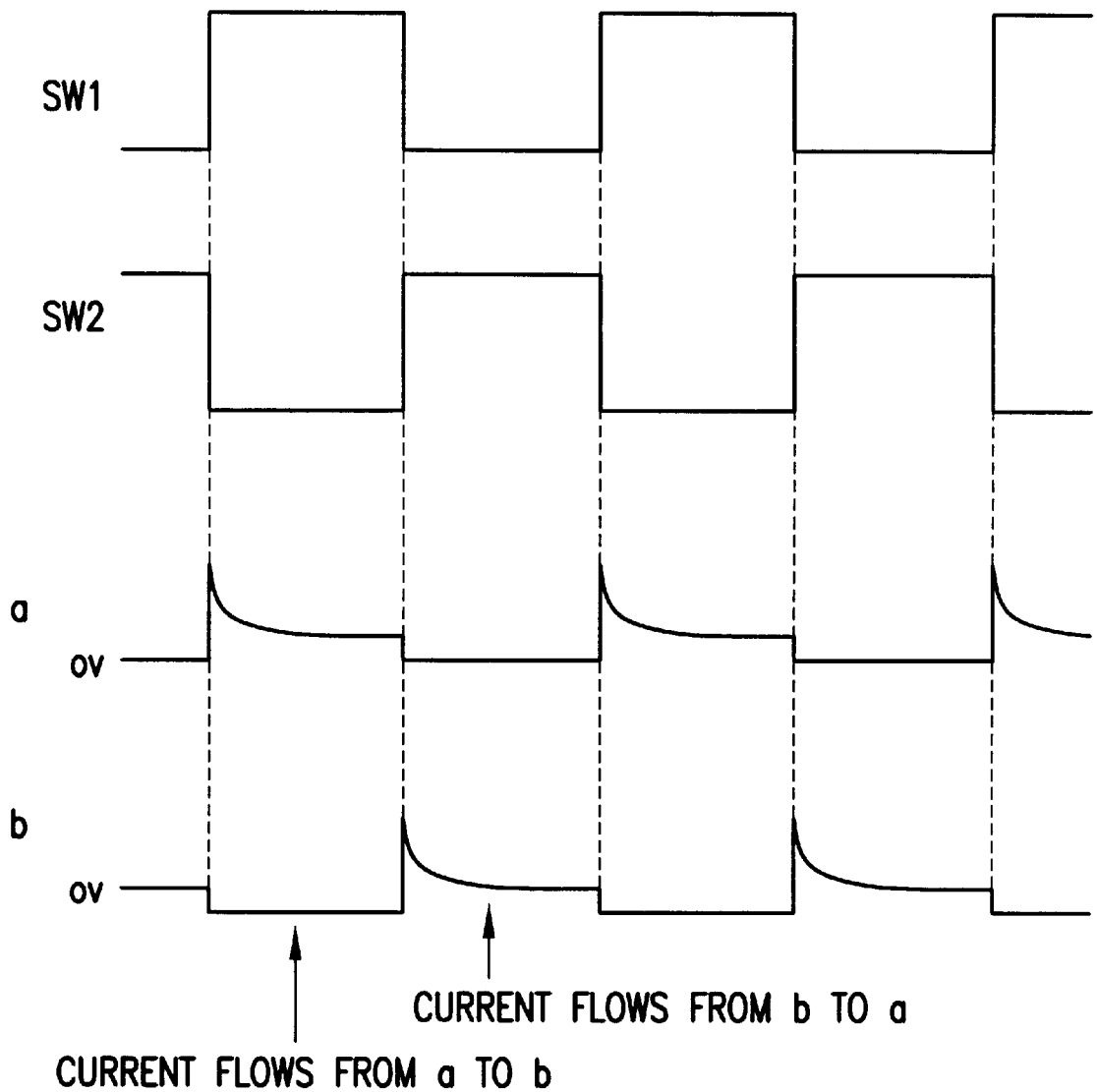
FIG. 8 is a view showing the relationship between magnetic recording signals and voltage applied to a coil of the magnetic head of FIG. 7.

In the example of FIG. 7, voltage is alternately applied to point "a" and point "b" of the coil 4 in response to magnetic recording signals Sw1, Sw2 during magnetic recording operations of the magnetic recording circuit 14, as shown in FIG. 8. In the meantime, the input of an operational amplifier (also called "ope-amp") A2 of the magnetic reproducing circuit 13 is connected to the point "a", and the output of an operational amplifier (also called "ope-amp") A1 of the magnetic reproducing circuit 13 is connected to the point "b". The input of the ope-amp A2 connected to the point "a" has a high impedance, and the current flowing into the input of the ope-amp A2 upon application of a voltage from the magnetic recording circuit 14 to the point "a" is small enough to be neglected, as compared with the coil current flowing from the point "a" to the point "b" through the coil 4.

On the other hand, the output of the ope-amp A1 connected to the point "b" has a low impedance. When a voltage is applied from the magnetic recording circuit 14 to the point "b", therefore, the current flows from the point "b" toward a capacitor C1 of the ope-amp A1 through a diode D1, and also flows into an output resistor R1 of the ope-amp A1. This current is considerably large not to be neglected compared to the coil current flowing from the point "b" to the point "a" through the coil 4.

In FIG. 6 showing the second embodiment as described above, peripheral components, such as diode D1, capacitor C1 and output resistor R1, of the ope-amp A1 as shown in FIG. 7 are not illustrated. These peripheral components of ope-amps are well-known in the art, and therefore no detailed description of these components will be provided.

It will be understood from the above explanation that the magnetic reproducing circuit 13 as viewed from the point "a" of the coil 4 has a high impedance, and the magnetic reproducing circuit 13 as viewed from the point "b" has a low impedance. Accordingly, the coil current flowing from the point "a" to the point "b" is increased rapidly when a voltage is applied to the point "a", but the coil current flowing from the point "b" to the point "a" is increased slowly when a voltage is applied to the point "b". This causes a problem that the magnetic recording/reproducing apparatus fails to perform normal magnetic recording operations.

In the second embodiment that is intended to solve the above problem, the reproducing circuit open switch 31 is opened during magnetic recording so as to disconnect the magnetic head 1 and the magnetic reproducing circuit 13 from each other. An a result, leakage of recording current from the magnetic recording circuit 14 to the magnetic reproducing circuit 13 during magnetic recording can be inhibited, and the current flowing through the coil is caused to rise sharply upon application of voltage to the coil, assuring improved reliability in magnetic recording operations.

Figure 9:
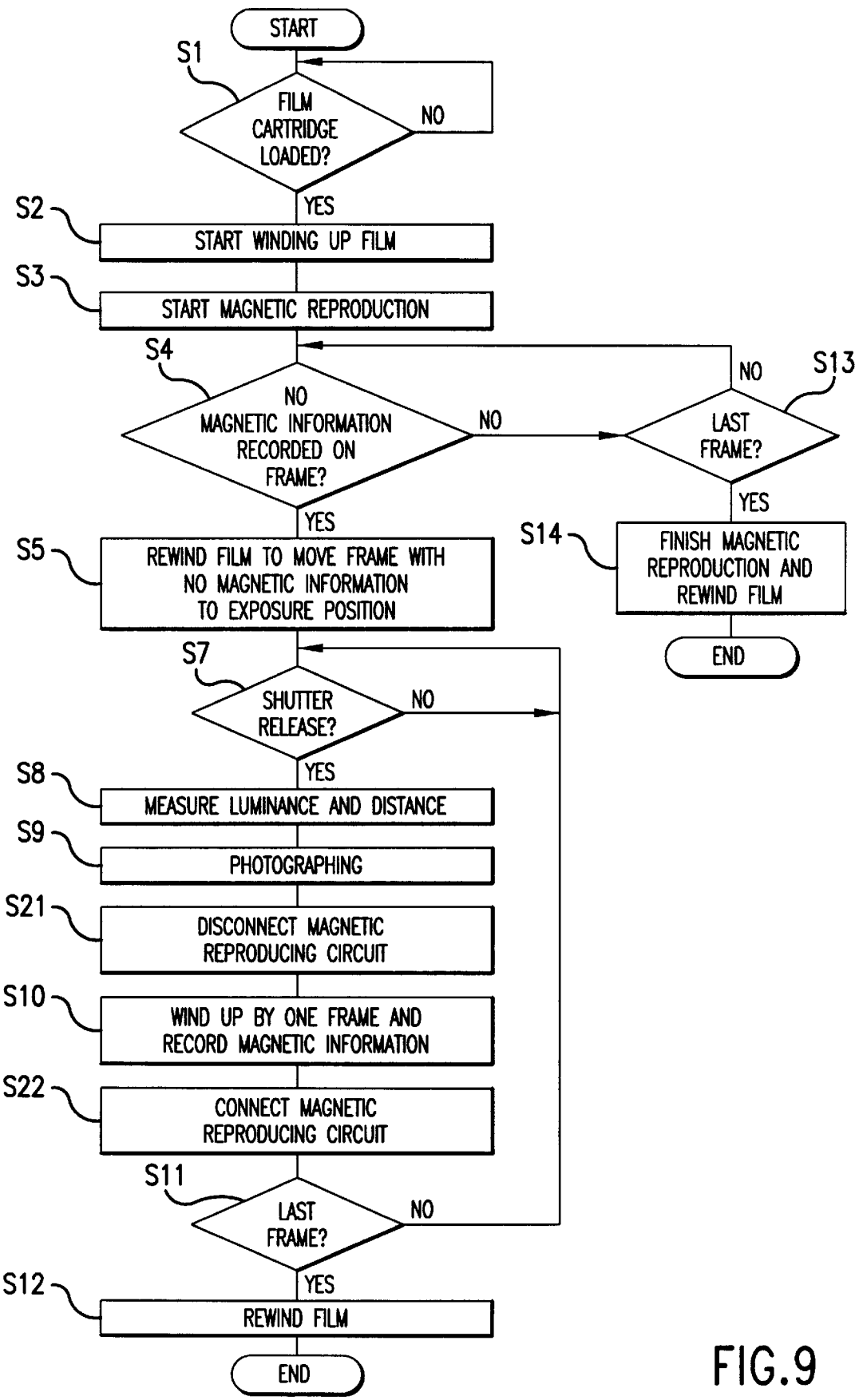
FIG. 9 is a flowchart showing the operation of the second embodiment.

FIG. 9 is a flowchart showing a control program performed by the controller 11 in the second embodiment. The same step numbers as used in the flowchart of FIG. 4 showing the first embodiment are used to identify the corresponding steps, and part of description of these steps are not provided herein. The flowchart of FIG. 9 is different from that of FIG. 4 in that step S6 is eliminated, and steps S21, S22 are added.

In step S5, the driver 17 is controlled to drive the motor 18 to rewind the film until the unexposed frame on which no magnetic information has not been recorded is brought back to the exposure position of the camera, and the control flow goes to step S7.

If depression of the release button is detected by means of the release switch 22 in step S7, the control flow goes to step SS to operate the light/distance measuring device 16 to measure the luminance of the subject and the photographing distance between the camera and the subject. Step S9 is then executed to control the driver 17 to drive the motor 19 so that the photographing lens is focused based on the photographing distance thus measured. Further, the exposure control apparatus 20 is controlled to drive the diaphragm mechanism and shutter, so that a picture is taken in accordance with the luminance of the subject measured by the light/distance measuring device 16.

In step S21 following the photographing action, the reproducing circuit open switch 31 is opened so as to disconnect the magnetic reproducing circuit 13 from the magnetic head 1. in the next step 10, the controller 11 controls the magnetic recording circuit 14 to cause the magnetic head 1 to record magnetic information about photographing on the film, while winding up the film by one frame by means of the driver 17 and motor 18. Step S22 is then executed to close the reproducing circuit open switch 31 so as to connect the magnetic reproducing circuit 13 to the magnetic head 1. In the next step S11, it is determined whether photographing has been finished with all frames including the last flame. If photographing has been finished with all frames including the last frame, step S12 is then executed to rewind the film into the cartridge by means of the driver 17 and motor 18. If a negative decision is obtained in step S11, namely, photographing has not been finished with all frames, the control flow returns to step S7, and the next frame is used for photographing.

Third embodiment

Figure 10:
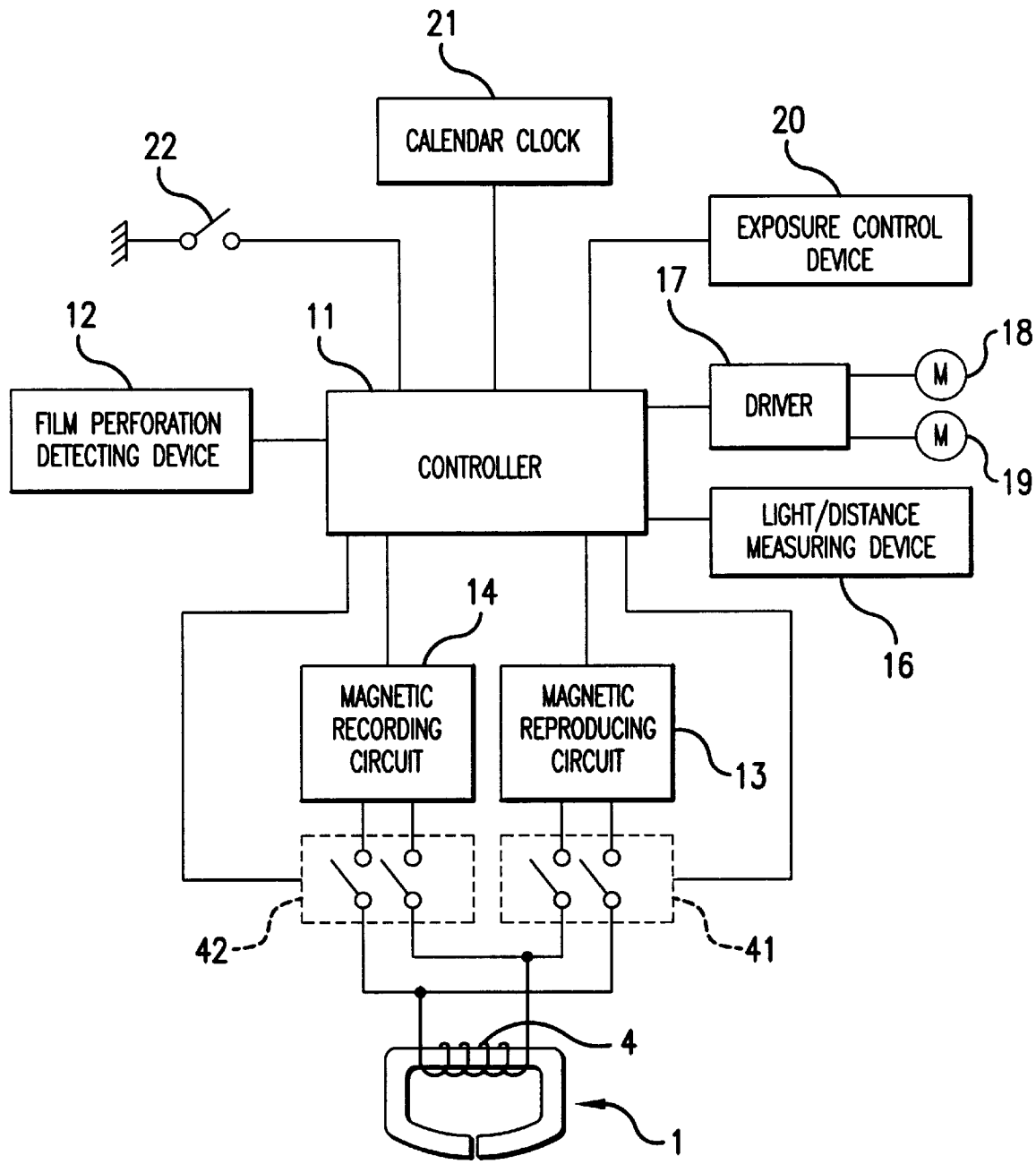
FIG. 10 is a view showing the construction of the third embodiment of the present invention.

FIG. 10 shows the construction of a magnetic recording/reproducing apparatus according to the third embodiment of the present invention. In FIG. 10, the same reference numerals as used in FIG. 2 showing the first, embodiment are used to identify the corresponding elements, of which no description will be provided. The third embodiment of FIG. 10 is different from the first embodiment of FIG. 2 in that a magnetic reproduction switch 41 is provided on the side of the magnetic reproducing circuit 13, and a magnetic recording switch 42 is provided on the side of the magnetic recording circuit 14. The magnetic head 1 is similar to that of the first embodiment shown in FIG. 1.

Figure 11:
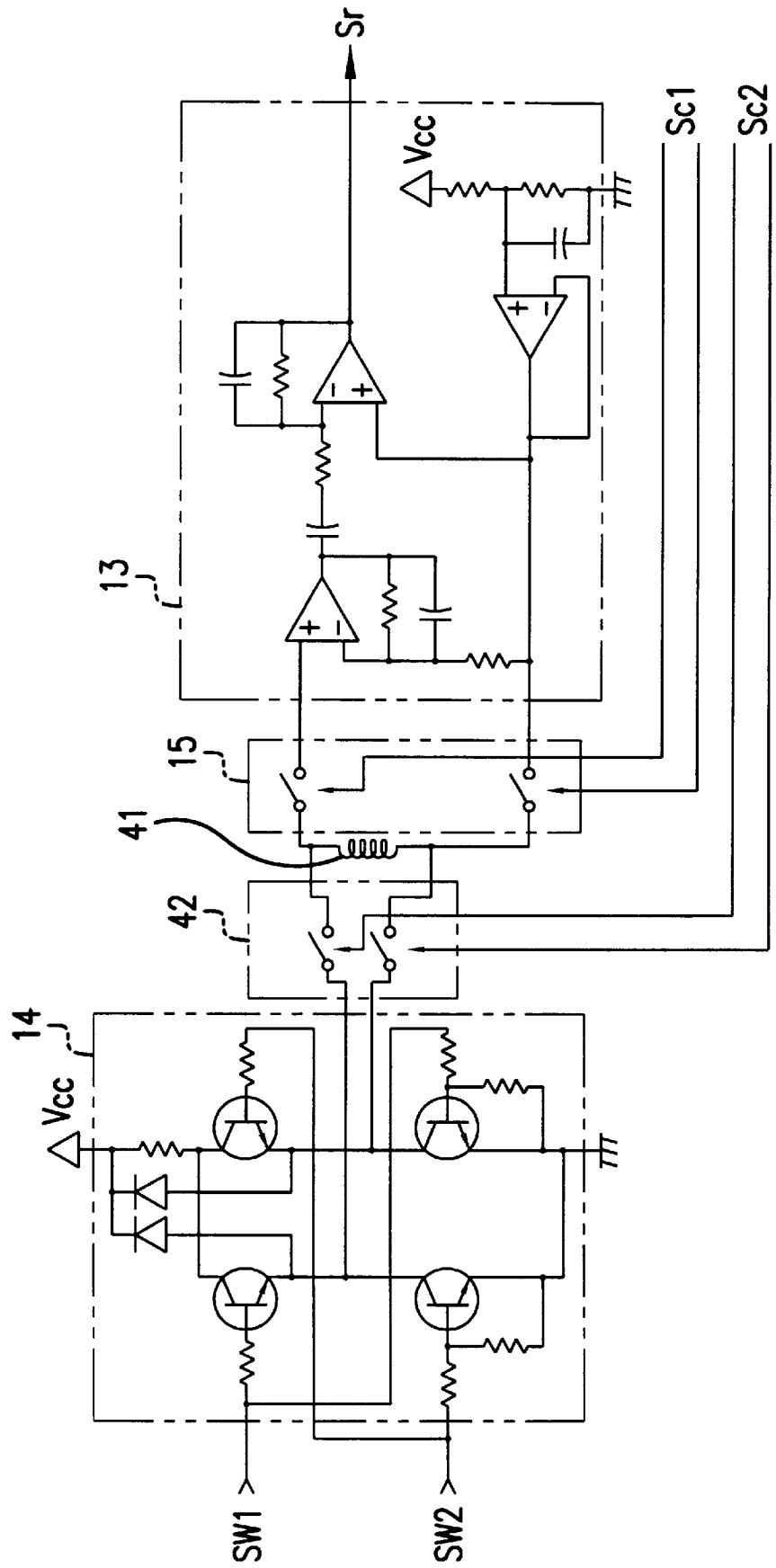
FIG. 11 is a circuit diagram showing in detail a magnetic reproducing circuit and a magnetic recording circuit of the third embodiment.

FIG. 11 is a circuit diagram showing in detail the magnetic reproduction switch 41, magnetic recording switch 42, magnetic reproducing circuit 13 and magnetic recording circuit 14. The magnetic reproducing circuit 13 amplifies a magnetic reproduction signal received from the coil 4 of the magnetic head 1, and outputs the resulting reproduced signal Sr to the controller 11. The magnetic recording circuit 14 causes recording current to flow through the coil 4 of the magnetic head 1 in opposite directions, in response to recording signals Sw1, Sw2 alternately received from the controller 11, and records magnetic digital information on the film.

The opening and closing of the magnetic reproduction switch 41 is controlled according to a control signal Sc1 from the controller 11, so as to connect the magnetic reproducing circuit 13 to the magnetic head 1 during magnetic reproduction. The opening and closing of the magnetic recording switch 42 is controlled according to a control signal Sc2 from the controller 11, so as to connect the magnetic recording circuit 14 to the magnetic head 1 during magnetic recording.

The magnetic reproduction switch 41 is closed only during magnetic reproducing operations to connect the magnetic head 1 and the magnetic reproducing circuit 13 to each other, and the magnetic recording switch 42 is closed only during magnetic recording operations to connect the magnetic head 1 and the magnetic recording circuit 14 to each other.

In this manner, the magnetic recording circuit 14 is disconnected from the magnetic head 1 during magnetic reproduction, so that noises are prevented from being transmitted from the magnetic recording circuit 14 that gives an antenna effect to the magnetic head 1, thus assuring improved reliability in magnetic reproducing operations. Further, the magnetic reproducing circuit 13 is disconnected from the magnetic head 1 during magnetic recording, so that leakage of recording current into the magnetic reproducing circuit 13 is inhibited, and the current flowing through the coil is caused to rise sharply upon application of voltage to the coil, assuring improved reliability in magnetic recording operations. Since the magnetic reproducing switch 41 and magnetic recording switch 42 are both opened while the film is transported with no magnetic information being recorded on or read out from the film, noises are prevented from being transmitted from the magnetic reproducing circuit 13 or magnetic recording circuit 14 to the magnetic head 1, and magnetic information that has already been recorded on the film will not be broken or damaged by noise current flowing into the magnetic head 1.

Figure 12:
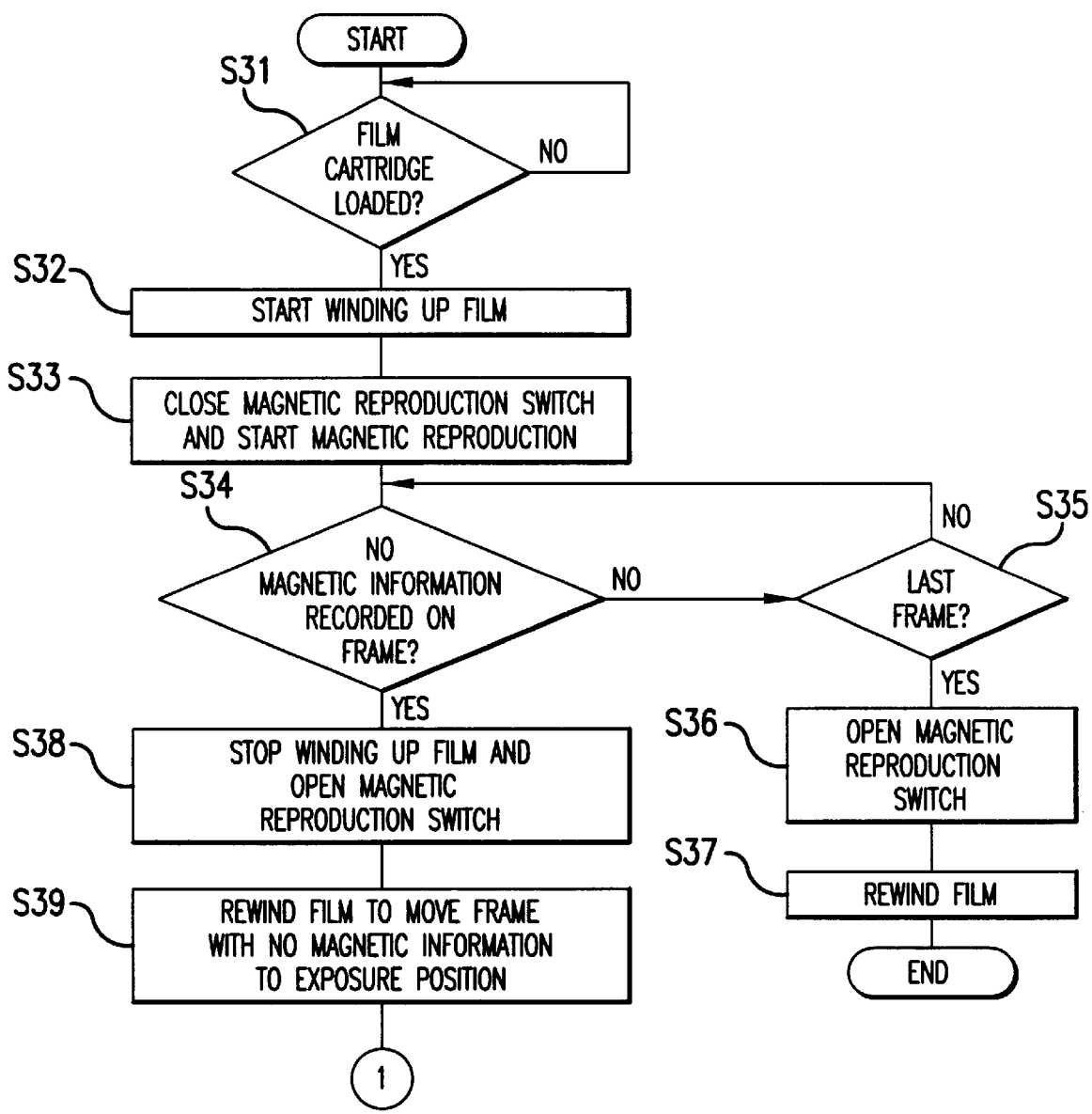
FIG. 12 is a flowchart showing the operation of the third embodiment.
Figure 13:
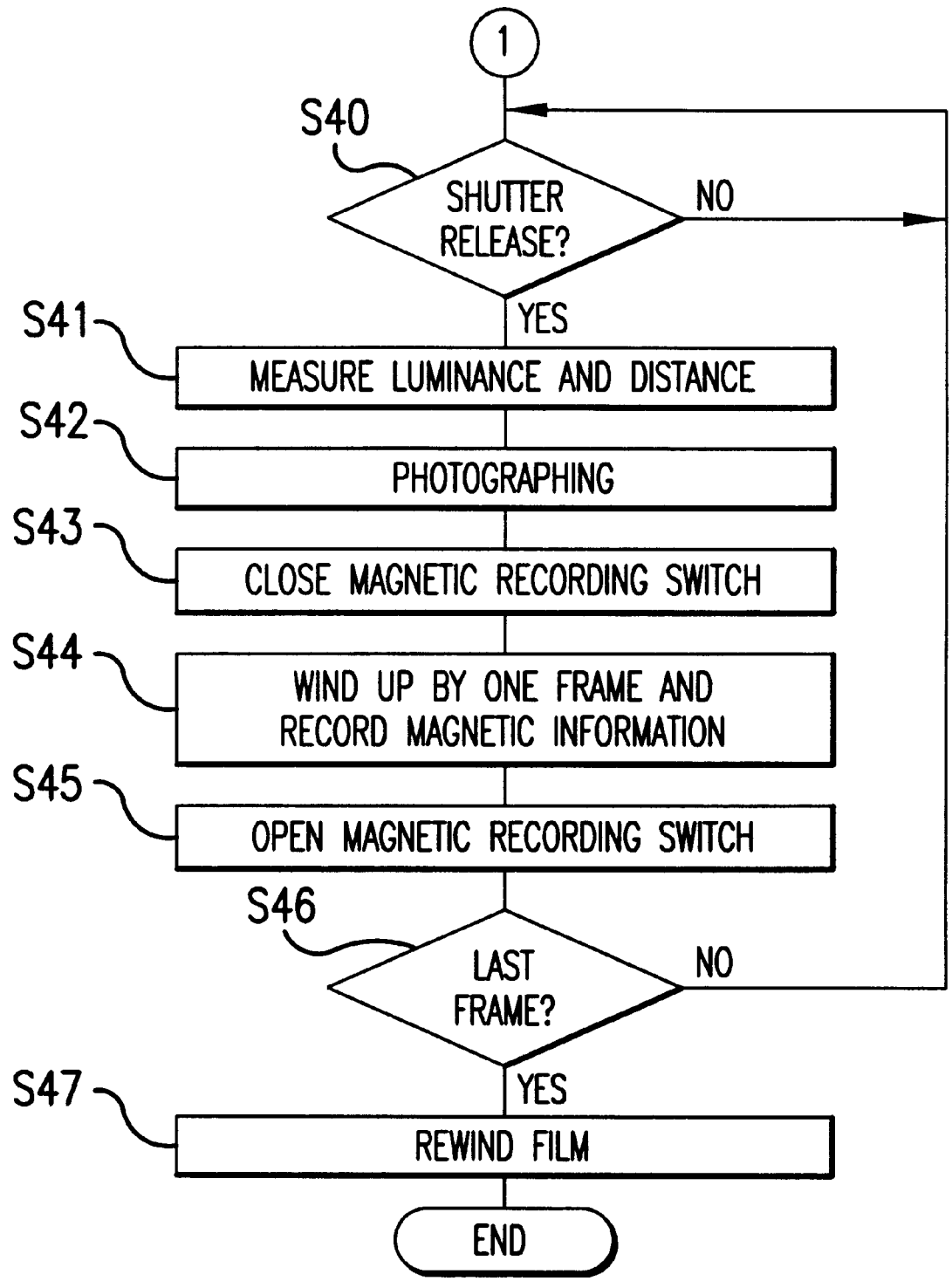
FIG. 13 is a flowchart following that of FIG. 12, showing the operation of the third embodiment.

FIG. 12 and FIG. 13 are flowcharts showing a control program executed by the controller 11. The operation of the present embodiment will be described referring to these flowcharts.

Initially, step S31 is executed to detect an ON/OFF state of a cartridge loading detection switch that is not illustrated, to determine whether a film cartridge is loaded in a cartridge chamber. If step S31 determines that the film cartridge is loaded in the cartridge chamber, step S32 is executed to control the driver 17 to drive the motor 18 so as to start winding up the film. In the next step S33, the magnetic reproducing switch 41 is closed to connect the magnetic reproducing circuit 13 to the magnetic head 1, and the magnetic reproducing circuit 13 is controlled so that the magnetic head 1 starts reproducing magnetic information on the film.

Step S34 is then executed to determine whether no magnetic information is recorded on a frame of the film that has been wound up to be brought into a position corresponding to the magnetic head 1.

In the present embodiment, the magnetic head 1 is used for both magnetic recording and magnetic reproduction. To record magnetic information about photographing on a frame with which a picture has been taken, the magnetic head 1 is installed on the side of a takeup spool (not shown) of the camera with respect to the exposure position (behind the aperture of the camera). In order to reproduce magnetic information recorded on a certain frame, therefore, this frame needs to be wound up by a distance corresponding to about one frame, beyond the exposure position, and the magnetic information on the film is reproduced during the wind-up operation.

When magnetic information is recorded on the frame in question in the current control cycle, this frame is determined to have been exposed to an image light, namely, the film has been used for photographing, and the control flow goes to step S35. In step S35, it is determined whether magnetic information has been recorded on this frame and following frames until the last frame is reached, and if magnetic information is recorded on all frames including the last frame, step S35 determines that photographing has been completed for all frames. The control flow then goes to step S36 to open the magnetic reproducing switch 41 to disconnect the magnetic reproducing circuit 13 from the magnetic head 1, and cause the magnetic reproducing circuit 13 to finish reproduction of magnetic information. In the following step S37, the driver 17 is controlled to drive the motor 18 so as to rewind the film into the cartridge. While step S35 determines that the film has not been would up until the last frame is reached, on the other hand, the control flow returns to step S34 to determine whether no magnetic information is recorded on the next frame.

When no magnetic information is recorded on the frame in question in the current cycle, it is determined in step S34 that the frame has not been exposed to an image light, and the control flow goes to step S38. In step S38, the driver 17 is controlled to cause the motor 18 to stop winding up the film, and the magnetic reproduction switch 41 is opened to disconnect the magnetic reproducing circuit 13 from the magnetic head 1, thereby to finish reproduction of magnetic information by the magnetic reproducing circuit 13. Step S39 is then executed to control the driver 17 to rewind the film by means of the motor 18, and the unexposed frame on which no magnetic information is recorded is brought back to the exposure position behind the aperture.

If depression of the release button is detected by means of the release switch 22 in step S40, the control flow goes to step S41 to operate the light/distance measuring device 16 to measure the luminance of the subject and the photographing distance between the camera and the subject. Step S42 is then executed to control the driver 17 to drive the motor 19 so that the photographing lens is focused based on the photographing distance thus measured. Further, the exposure control apparatus 20 is controlled to drive the diaphragm mechanism and shutter, so that a picture is taken in accordance with the luminance of the subject measured by the light/distance measuring device 16.

In step S43 following the photographing action, the magnetic recording switch 42 is closed to connect the magnetic recording circuit 14 to the magnetic head 1. In the next step S44, the controller 11 controls the magnetic recording circuit 14 to record magnetic information about photographing on the film by means of the magnetic head 1, while winding up the film by one frame by means of the driver 17 and motor 18. After winding up the film by one frame, step S45 is executed to open the magnetic recording switch 42 to disconnect the magnetic recording circuit 14 from the magnetic head 1. In step S46, it is determined whether photographing has been finished with all frames including the last flame. If photographing has been finished with all frames including the last frame, step S47 is then executed to rewind the film into the cartridge by means of the driver 17 and motor 18. If a negative decision is obtained in step S46, namely, photographing has not been finished with the last frame, the control flow returns to step S40, and the next frame is used for photographing.

Fourth embodiment

Figure 14:
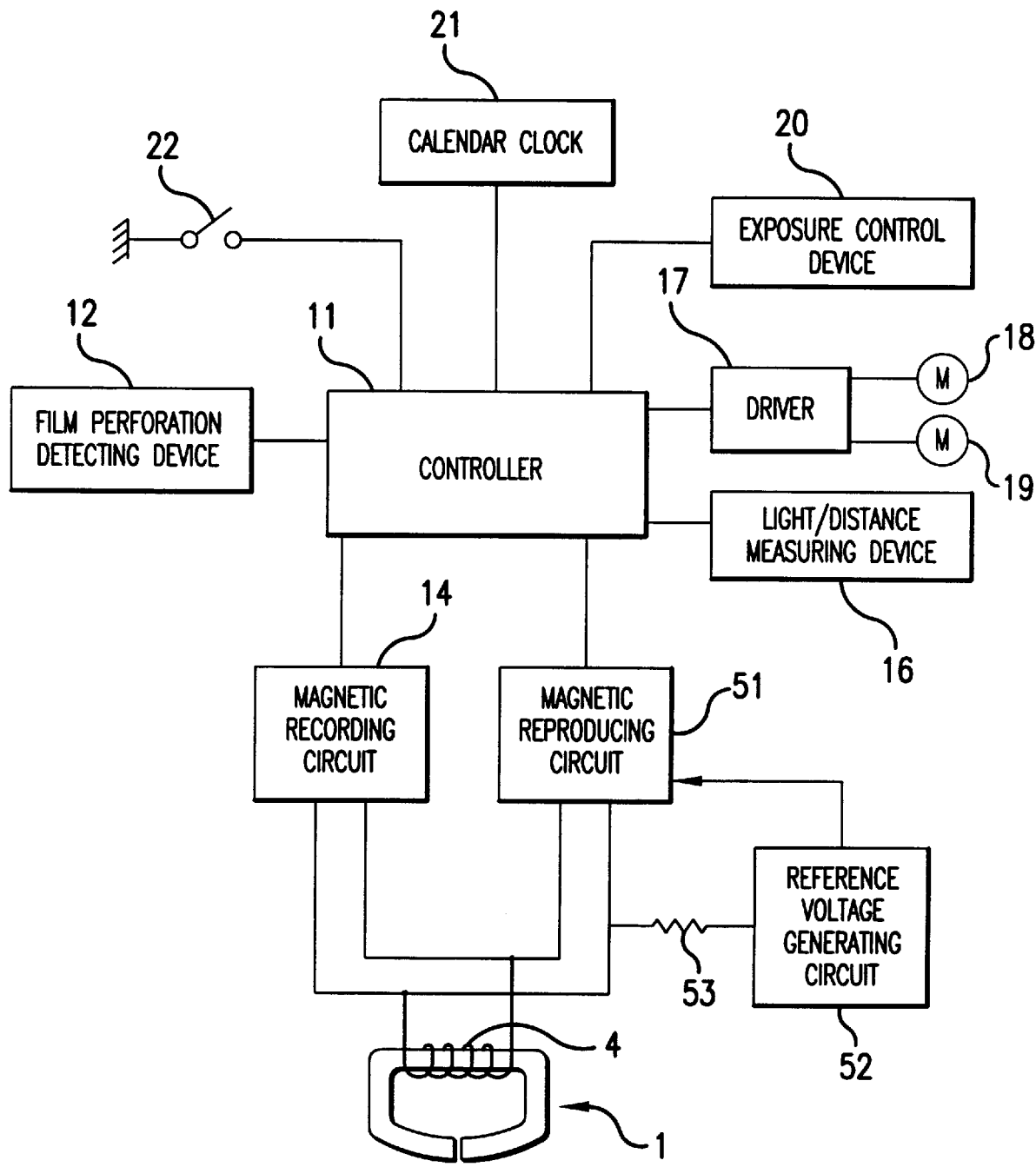
FIG. 14 is a view showing the construction of the fourth embodiment of the present invention.

FIG. 14 shows the construction of a magnetic recording/reproducing apparatus according to the fourth embodiment of the present invention. In FIG. 14, the same reference numerals as used in FIG. 2 showing the first embodiment are used to identify the corresponding elements, of which no description is provided. The fourth embodiment of FIG. 14 is different from the first embodiment of FIG. 2 in the structure of a magnetic reproducing circuit 51 equipped with a reference voltage generating circuit 52. While the magnetic reproducing circuit 51 and reference voltage generating circuit 52 are separately illustrated in FIG. 14, one can suppose that a reference voltage generating circuit that is incorporated in the magnetic reproducing circuit 13 of FIG. 2 is replaced by the reference voltage generating circuit 52 and a resistor 53 in the present embodiment. The reference voltage generating circuit 52 serves to establish a reference potential of an operational amplifier (also called ope-amp). The resistor 53 is provided for eliminating influences of the reference voltage generating circuit during magnetic writing. The magnetic head of this embodiment is similar to that of the first embodiment shown in FIG. 1.

Figure 15:
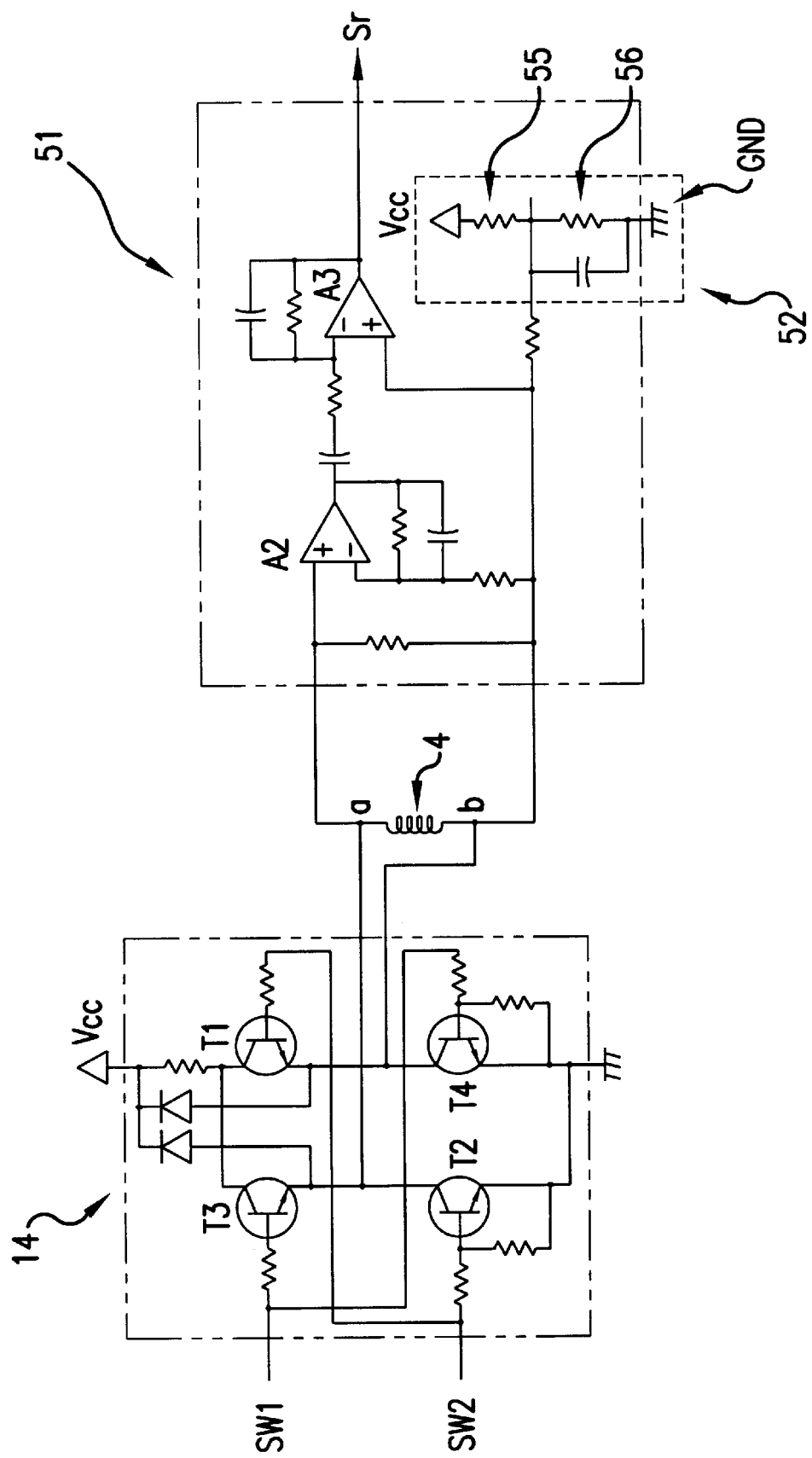
FIG. 15 is a circuit diagram showing in detail a magnetic reproducing circuit and a magnetic recording circuit of the fourth embodiment.
Figure 16:
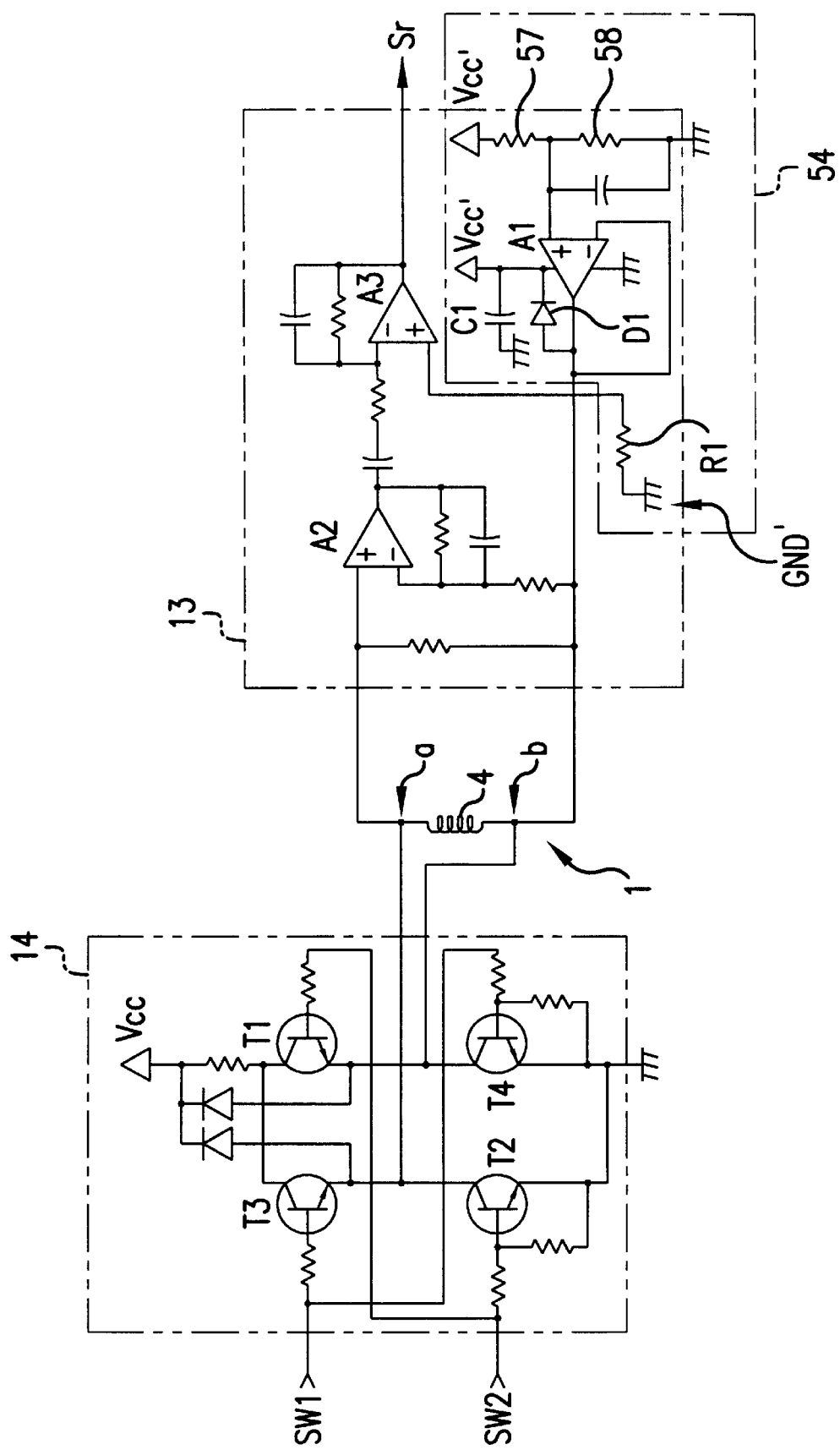
FIG. 16 is a view showing a comparative example for the fourth embodiment.

The circuit arrangement of the magnetic reproducing circuit 51 and magnetic recording circuit 14 of the fourth embodiment as shown in FIG. 15 will be described with reference to a comparative example shown in FIG. 16 in which the magnetic reproducing circuit 13 and magnetic recording circuit 14 are kept connected to the magnetic head 1 all the time. The circuit arrangement of FIG. 16 is identical with that of the second embodiment shown in FIG. 7. The reference voltage generation circuit 52 of FIG. 15 is equivalent to a reference voltage generation circuit 54 shown in FIG. 16 in terms of the function to establish a reference voltage. The reference voltage generating circuit 52 of FIG. 15 utilizes resistance division of resistors 55, 56 to generate a reference voltage, whereas the reference voltage generating circuit 54 of FIG. 16 uses the ope-amp A1 to generate a reference voltage. FIG. 16 shows components, such as diode D1, output resistor R1 and capacitor C1, that exist in an integrated circuit (IC) of the ope-amp A1. These components are known as existing in an IC of a conventional ope-amp, and therefore will not be described in detail. Whether the ope-amp A1 is to be provided or not is determined depending upon various conditions, such as resistance values of resistors 55, 56, 57, 58 used for resistance division.

If the magnetic reproducing circuit 13 and magnetic recording circuit 14 are always connected to the magnetic head 1 as shown in FIG. 16, the magnetic reproducing circuit 13 as viewed from the point "a" of the coil 4 has a high impedance, and the same circuit 13 as viewed from the point "b" of the coil 4 has a low impedance, as described above with respect to the second embodiment of FIG. 7. Accordingly, the coil current flowing from the point "a" to the point "b" is increased rapidly when a voltage is applied to the point "a", but the coil current flowing from the point "b" to the point "a" is increased slowly when a voltage is applied to the point "b". This causes a problem that the magnetic recording circuit 14 cannot perform normal magnetic recording.

In the fourth embodiment, therefore, the resistor 53 is inserted as shown in FIG. 15 so as to improve a rising characteristic of the current. With the resistor 53 thus inserted as shown in FIG. 15, the voltage at the point "b" can be more easily varied with respect to the ground (GND) or Vcc. The resistor 53 that functions in this manner may not be inserted in such cases where the resistors 55, 56 have sufficiently large resistance values (of 10 kΩ or larger, for example).

Figure 17:
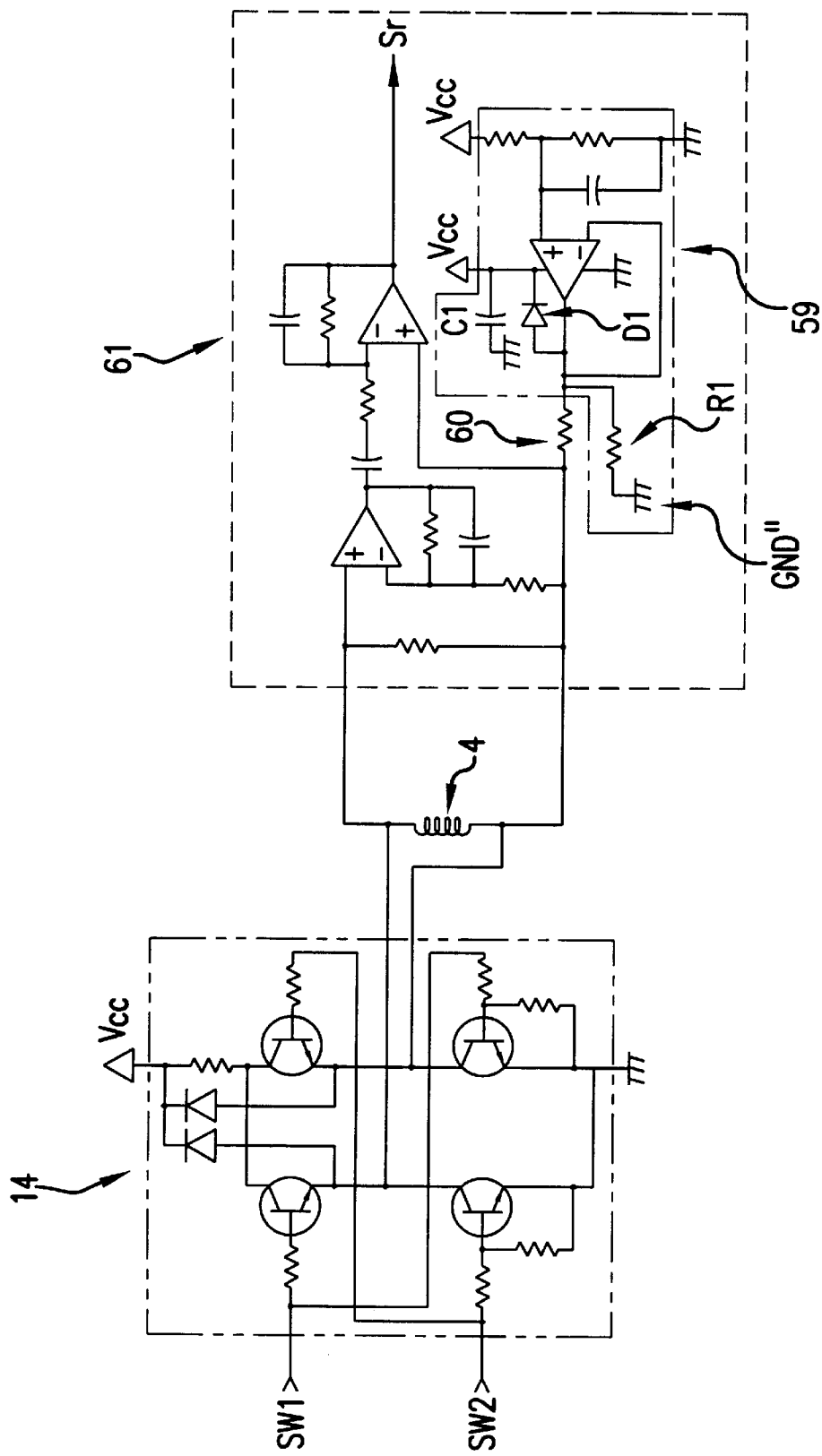
FIG. 17 is a circuit diagram showing in detail a modified example of the magnetic reproducing circuit and magnetic recording circuit of the fourth embodiment.

In order to provide a similar effect in FIG. 16 using the ope-amp A1, the resistance of the resistor 53 is made larger than that of the resistor R1. In the arrangement of FIG. 16, a resistor corresponding to the resistor 53 of FIG. 15 is inserted so that the voltage at the point "b" can be more easily varied with respect to the ground (GND'). FIG. 17 shows a specific example in which a resistor 60 that corresponds to the resistor 53 of FIG. 15 is inserted in the circuit arrangement of FIG. 16. The reference voltage generating circuit 59 of FIG. 17 is equivalent to the reference voltage generating circuit 54 of FIG. 16. While the reference voltage generating circuit of FIG. 15 is constituted by a divided resistor (two resistors 55, 56) without using an ope-amp, the reference voltage generating circuit in the arrangement of FIG. 17 uses an ope-amp. In the circuit arrangement of FIG. 17, the resistor 60 is inserted which has a sufficiently large resistance value as compared with the resistance value of the resistor R1 between the input of the ope-amp and GND", so that the voltage at the terminal "b" can be readily varied during magnetic recording, assuring improved response of the magnetic head 1 to the applied voltage.

As described above, sharp rising and falling of the current flowing through the coil 4 can be maintained by inserting a resistor in a path through which undesired recording current flows during magnetic recording, and the thus obtained recording circuit does not suffer from delays in the phase of current waveform in response to changes in the direction of recording signal. Also, the magnetic recording/reproducing apparatus of the present embodiment provide a sufficiently high S/N ratio during magnetic reproduction. This eliminates a need to provide change-over switches for disconnecting the magnetic reproducing circuit 51 from the coil 4 during magnetic recording, and disconnecting the magnetic recording circuit 14 from the coil 4 during magnetic reproduction. Thus, the present apparatus is available at reduced cost.

A coil may be inserted in place of the resistor 53. Namely, any circuit element having a high impedance may be inserted as long as the element functions to prevent undesired flow of recording current during magnetic recording operations.

If the coil 4 of the magnetic head 1 consists of a large number of turns or loops, however, the rising characteristic of the coil current is not improved even if the resistor or coil is inserted as described above. Since the S/N ratio during magnetic reproduction is lowered if the number of turns is reduced to improve magnetic recording characteristics, the specification of wiring of the coil 4, such as the number of turns, is determined depending upon which of magnetic writing and magnetic reading is given priority.

TABLE 1 below shows the relationship between the film transport speed and the responsibility during magnetic writing. This table shows the inductance of the coil 4 when the diameter of the wire of the coil 4 is controlled to 25 μm. The relationship between the inductance L of the coil 4 and the number of turns N is represented by the following expression (1).

$$L \propto N^2 \text{ (where the magnetic resistance is constant)} \tag{1}$$

The relationship between the number of turns N of the coil 4 and the direct current resistance DCR is represented by the following expression (2).

$$N \propto DCR \text{ (where the diameter of the coil is constant)} \tag{2}$$

Since the rising characteristic of the magnetic writing current is proportional to the inductance value, the upper limit to the film transport speed is varied.

TABLE 1

| | | | |
|---|---|---|---|
| (where the diameter of the coil is 25 μm) | | | |
| Number of Turns | Inductance | DCR | Limit to Film Transport Speed |
| 200 | 4 mH | 30Ω | 450 mm/sec or lower |
| 300 | 10 mH | 45Ω | 200 mm/sec or lower |
| 400 | 18 mH | 68Ω | 112 mm/sec or lower |
| 500 | 28 mH | 75Ω | 72 mm/sec or lower |

Generally, the battery voltage of a power supply for a lens shutter camera is 3V, and the battery voltage for a single-lens reflex camera is 6V. The lens shutter camera and single-lens reflex camera have different ranges of film transport speed due to the difference in the power supply voltage: the film transport speed of the lens shutter camera is in the range of 40 to 80 mm/sec, and the film transport speed of the single-lens reflex camera is in the range of 100 to 250 mm/sec. To reduce cost by using common parts for these types of cameras, the maximum number of turns of wire (determined based on responsibility of magnetic recording characteristic during magnetic writing) where the film transport speed is set to the maximum value of 250 mm/sec needs to be employed. It is desirable that this value be equal to 300 turns, as is understood from TABLE 1.

It is most desirable to determine the number of turns based on the level of the S/N ratio during magnetic reproduction. When the S/N ratio is sufficiently high, the number of turns of the coil may be set to 300 turns, so as to improve the rising characteristic of the coil current during magnetic recording. It the S/N ratio is low, on the other hand, the number of turns of the coil may be set to 500 turns, so as to increase the S/N ratio during magnetic reproduction.

The following are some measures for increasing the S/N ratio, setting the number of turns of the coil to 300 turns, and ensuring sufficiently high quality of magnetic writing:

1. The magnetic head for magnetic recording and reproducing is spaced 20 mm or more from the motor for transporting the film.

2. The film transport motor is installed such that the magnetic output of the motor is directed with respect to the magnetic recording/reproducing head, in such a direction that the head receives the weakest magnetic output from the motor (a direction in which directive characteristic of magnetic output from the motor is the lowest).

3. The magnetic head is covered with a shield case having an improved antimagnetic property. For example, the shield case is formed of permalloy, and has a thickness of 0.3 mm or greater.

4. The magnetic shielding characteristics of the film transport motor is improved by suitably selecting the material and thickness of a case of the motor. For example, the case is formed of pure iron, and has a thickness of 0.3 mm or greater.

5. The outer periphery of the film transport motor is surrounded by a magnetic shield case. For example, the shield case is formed of permalloy, and has a thickness of 0.3 mm or greater.

6. A booster coil for a DC/DC converter is spaced 50 mm or more from the magnetic recording/reproducing head.

7. The booster coil for the DC/DC converter is installed go that the magnetic output of the coil is directed with respect to the magnetic recording/reproducing head, in such a direction that the magnetic head receives the weakest magnetic output from the booster coil (a direction in which directive characteristic of magnetic output from the booster coil is the lowest).

If all of the measures described above in items 1. to 7. are adopted, magnetic noises generated by the film transport motor and booster coil for the DC/DC converter are considerably reduced to such a level that no problem occurs when the magnetic reproducing circuit reproduces a signal recorded on the film. However, the cost is undesirably increased if all of the measures are taken. In cameras having a high film transport speed, a sufficiently high S/N ratio can be achieved without taking all of the measures as described above. The following are appropriate ranges of the number of turns of coil (for providing a sufficiently high S/N ratio) under certain conditions.

(1) Where the film transport speed during magnetic writing is in the range of 100 to 250 mm/sec, the number of turns of the coil of the magnetic head is set to be within the range of 250 to 350 turns.

(2) Where the film transport speed during magnetic writing is in the range of 30 and 100 mm/sec, the number of turns of the coil of the magnetic head is set to be within the range of 450 to 550 turns.

(3) Where the spacing between the magnetic head and the motor for transporting the film is 20 mm or larger, the number of turns of the coil of the magnetic head is set to be within the range of 250 to 350 turns.

(4) Where the outer periphery of the film transport motor is surrounded by a magnetic shield member for confining a magnetic field generated by the motor, the number of turns of the coil of the magnetic head is set to be within the range of 250 to 350 turns.

If the number of turns of the coil is determined as described above in paragraphs (1) to (4), taking account of the rising and falling characteristics of the coil current and film transport speed during magnetic recording, and the S/N ratio of reproduced signal during magnetic reproduction, the waveform of the coil current when observed with respect to the film transport amount or distance maintains steep rises and falls during magnetic recording even if not all of the measures 1.–7. as described above are adopted. Also, the magnetic recording/reproducing apparatus of the present embodiment provide a sufficiently high S/N ratio during magnetic reproduction.

When the magnetic recording/reproducing apparatus is used in cameras having a film transport speed of about 80 mm/sec or lower, it is desirable to take all of the measures 1.–7. as described above.

As illustrated in the second embodiment, if the level of noises transmitted from the magnetic recording circuit 14 operating as an antenna is small enough to be neglected, the modified example as shown in FIG. 7 may be employed in which the magnetic reproducing circuit 13 and magnetic recording circuit 14 are kept connected to the magnetic head 1.

What is claimed is:

1. A magnetic recording/reproducing apparatus of a camera, comprising:

a magnetic head having a single coil;

a recording circuit that causes said magnetic head to record magnetic information on a film;

a reproducing circuit that causes said magnetic head to reproduce magnetic information recorded on the film; and a disconnecting circuit that disconnects said recording circuit from said magnetic head during magnetic reproduction by said reproducing circuit, wherein a number of turns of said coil is determined in view of rising and falling characteristics of current flowing through the coil and a film transport speed during magnetic recording, and a S/N ratio of a reproduced signal during magnetic reproduction.

2. A magnetic recording/reproducing apparatus of a camera, comprising:

a magnetic head having a single coil;

a recording circuit that causes said magnetic head to record magnetic information on a film;

a reproducing circuit that causes said magnetic head to reproduce magnetic information recorded on the film; and a disconnecting circuit that disconnects said reproducing circuit from said magnetic head during magnetic recording by said recording circuit, wherein a number of turns of said coil is determined in view of rising and falling characteristics of current flowing through the coil and a film transport speed during magnetic recording, and a S/N ratio of a reproduced signal during magnetic reproduction.

3. A magnetic recording/reproducing apparatus of a camera, comprising:

a magnetic head having a single coil;

a recording circuit that causes said magnetic head to record magnetic information on a film;

a reproducing circuit that causes said magnetic head to reproduce magnetic information recorded on the film;

a recording disconnecting circuit that disconnects said recording circuit from said magnetic head during magnetic reproducing; and a reproduction disconnecting circuit that disconnects said reproducing circuit from said magnetic head during magnetic recording, wherein a number of turns of said coil is determined in view of rising and falling characteristics of current flowing through the coil and a film transport speed during magnetic recording, and a S/N ratio of a reproduced signal during magnetic reproduction.

4. A magnetic recording/reproducing apparatus of a camera, comprising;
- a magnetic head having a single coil;
- a recording circuit that causes said magnetic head to record magnetic information on a film;
- a reproducing circuit that causes said magnetic head to reproduce magnetic information recorded on the film;
- a reference potential circuit connected to said reproducing circuit so as to establish a reference potential of the reproducing circuit; and
- a high impedance element that is connected between said recording circuit and said reference potential circuit.

5. A magnetic recording/reproducing apparatus of a camera, comprising;
- a magnetic head having a single coil;
- a recording circuit that causes said magnetic head to record magnetic information on a film; and
- a reproducing circuit that causes said magnetic head to reproduce magnetic information recorded on the film, wherein
- a number of turns of the coil of said magnetic head is determined in view of a film transport speed during magnetic writing.

6. A magnetic recording/reproducing apparatus according to claim 5, wherein the number of turns of the coil of said magnetic head is set to be within a range of 250 to 350 turns when the film transport speed during magnetic writing is in a range of 100 to 250 mm/sec.

7. A magnetic recording/reproducing apparatus according to claim 5, wherein the number of turns of the coil of said magnetic head is set to be within a range of 450 to 550 turns when the film transport speed during magnetic writing is in a range of 30 to 100 mm/second.

8. A magnetic recording/reproducing apparatus of a camera, comprising;
- a magnetic head having a single coil;
- a recording circuit that causes said magnetic head to record magnetic information on a film; and
- a reproducing circuit that causes said magnetic head to reproduce magnetic information recorded on the film, wherein
- a number of turns of the coil of said magnetic head is set to be within a range of 250 to 350 turns when an axial spacing between said magnetic head and a motor for transporting the film is 20 mm or more.

9. A magnetic recording/reproducing apparatus of a camera, comprising;
- a magnetic head having a single coil;
- a recording circuit that causes said magnetic head to record magnetic information on a film; and
- a reproducing circuit that causes said magnetic head to reproduce magnetic information recorded on the film, wherein
- a number of turns of the coil of said magnetic head is set to be within a range of 250 to 350 turns when a magnetic shield is provided around an outer periphery of a motor for transporting the film.

* * * * *